US012763254B2

(12) United States Patent
Lai et al.

(10) Patent No.: US 12,763,254 B2
(45) Date of Patent: Oct. 13, 2026

(54) CAPACITOR STRUCTURE INCLUDING OXYGEN DONOR LAYERS

(71) Applicant: TAIWAN SEMICONDUCTOR MANUFACTURING COMPANY LTD., Hsinchu (TW)

(72) Inventors: Hsin-Yu Lai, Hsinchu (TW); Katherine H. Chiang, New Taipei City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 136 days.

(21) Appl. No.: 18/784,936

(22) Filed: Jul. 26, 2024

(65) Prior Publication Data

US 2024/0387108 A1 Nov. 21, 2024

Related U.S. Application Data

(63) Continuation of application No. 17/370,593, filed on Jul. 8, 2021, now Pat. No. 12,136,517.

(51) Int. Cl.
*H01G 4/10* (2006.01)
*H01G 4/33* (2006.01)

(52) U.S. Cl.
CPC ................. *H01G 4/10* (2013.01); *H01G 4/33* (2013.01)

(58) Field of Classification Search
CPC .................................. H01G 4/33; H01G 4/10
See application file for complete search history.

(56) References Cited

U.S. PATENT DOCUMENTS

| | | | | |
|---|---|---|---|---|
| 8,435,854 B1 * | 5/2013 | Malhotra | H10D 1/68 | 257/E21.396 |
| 9,012,298 B2 * | 4/2015 | Malhotra | H10D 1/684 | 438/240 |
| 2001/0001208 A1 * | 5/2001 | Nakamura | H01G 4/008 | 257/295 |
| 2008/0247116 A1 * | 10/2008 | Kawano | H01G 4/35 | 361/302 |
| 2012/0092807 A1 * | 4/2012 | Popovici | H10P 14/6544 | 361/321.1 |
| 2013/0155572 A1 * | 6/2013 | Popovici | H10D 1/688 | 427/532 |

FOREIGN PATENT DOCUMENTS

| | | | | |
|---|---|---|---|---|
| EP | 0514149 A1 * | 11/1992 | H10D 1/696 |
| JP | H08274270 A * | 10/1996 | |

* cited by examiner

*Primary Examiner* — David M Sinclair
(74) *Attorney, Agent, or Firm* — WPAT LAW; Anthony King

(57) ABSTRACT

A capacitor structure includes a first electrode, a second electrode, a dielectric layer between the first electrode and the second electrode, a first oxygen donor layer between the dielectric layer and the first electrode, a second oxygen donor layer between the dielectric layer and the second electrode, a first conductive layer between the first oxygen donor layer and the dielectric layer, and a second conductive layer between the second oxygen donor layer and the dielectric layer. An oxygen concentration of the first oxygen donor layer increases. An oxygen concentration of the second oxygen donor layer increases. A metal atom of the first electrode and a metal atom of the second electrode are different from a metal atom of the first oxygen donor layer and different from a metal atom of the second oxygen donor layer.

20 Claims, 26 Drawing Sheets

200

300

400

500

CAPACITOR STRUCTURE INCLUDING OXYGEN DONOR LAYERS

PRIORITY CLAIM AND CROSS-REFERENCE

This application is a continuation of U.S. patent application Ser. No. 17/370,593, filed on Jul. 8, 2021, entitled of "CAPACITOR STRUCTURE AND MANUFACTURING METHOD AND OPERATING METHOD THEREOF", which is incorporated herein by reference.

BACKGROUND

Electronic equipment involving semiconductor devices are essential for many modern applications. Technological advances in materials and design have produced generations of semiconductor devices where each generation has smaller and more complex circuits than the previous generation. Capacitors (also known as condensers) are electrical components used to store potential energy in electrical fields and are designed for enhancing capacitance to a circuit of an electronic and electrical system, such as logic devices, CMOS image sensors (CIS), radio frequency integrated circuits (RFIC), and monolithic microwave integrated circuits (MMIC). Capacitive structures include, for example, metal-oxide-semiconductor (MOS) capacitors, p-n junction capacitors and metal-insulator-metal (MIM) capacitors. However, there are many challenges in improving the performance of the capacitors.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
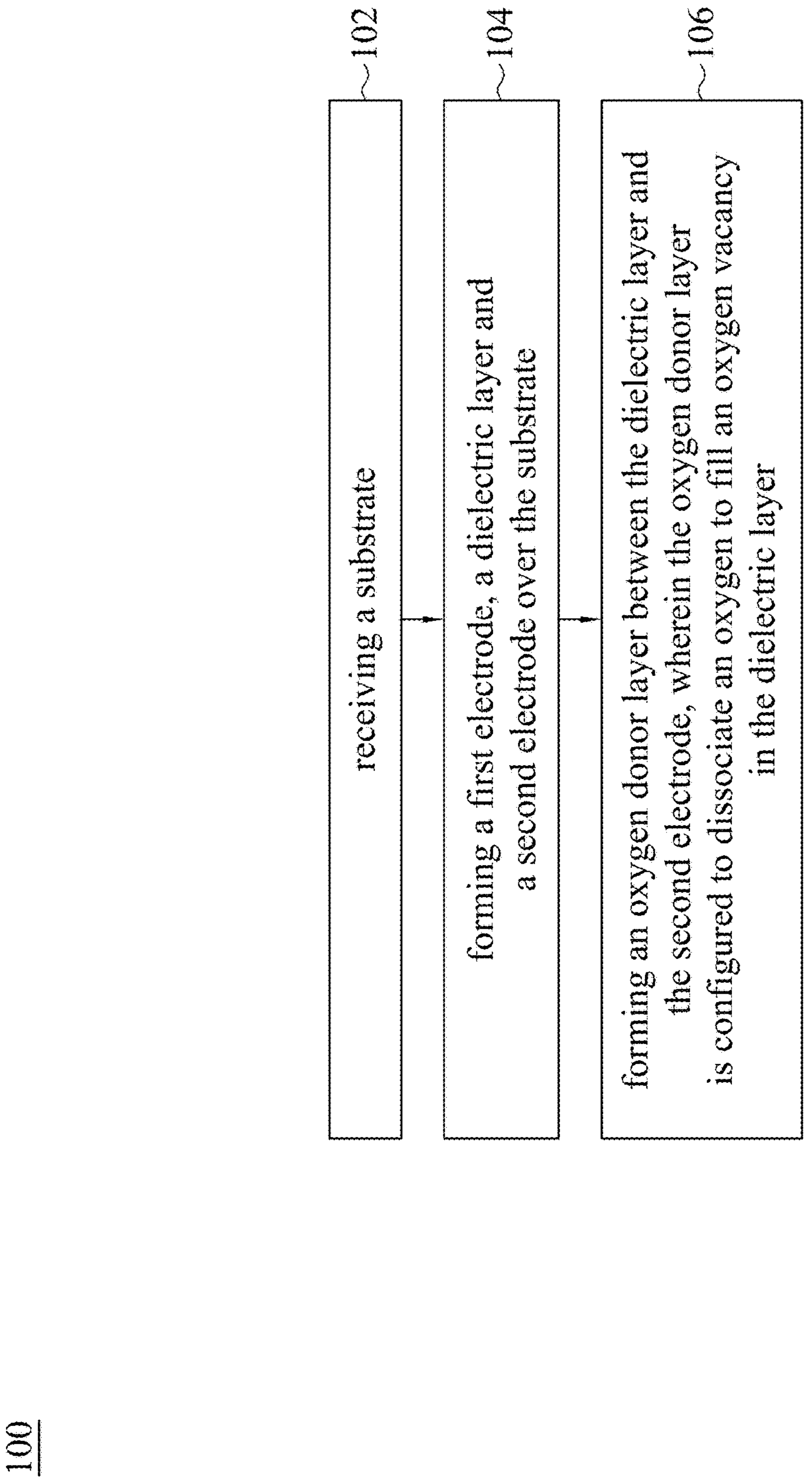
FIG. 1 is a flowchart representing a method 100 for forming a capacitor structure according to aspects of one or more embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to +0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to +0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°. For example, "substantially" perpendicular can refer to a range of angular variation relative to 900 that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.1, or less than or equal to ±0.05°.

Some embodiments of the present disclosure provide a capacitor structure, a method for manufacturing thereof and a method for operation thereof. The capacitor structure includes one or more oxygen donor layers which may provide oxygen to the oxygen vacancies in the dielectric layer during the operation. Thus, the density of the oxygen vacancies in the dielectric layer may be reduced.

FIG. 1 is a flowchart representing a method 100 for forming a capacitor structure 200 according to aspects of one or more embodiments of the present disclosure. The method 100 for forming the capacitor structure 200 includes an operation 102 where a substrate is received. The method 100 further includes an operation 104 where a first electrode, a dielectric layer and a second electrode are formed over the substrate. The method 100 further includes an operation 106 where an oxygen donor layer is formed between the dielectric layer and the second electrode. In some embodiments, the oxygen donor layer is configured to dissociate an oxygen atom to fill an oxygen vacancy in the dielectric layer. The terms such as "the first electrode" and "the second electrode" used herein do not imply a sequence or order.

The method is for illustrating concepts of the present disclosure and is not intended to limit the present disclosure beyond what is explicitly recited in the claims. Additional operations can be provided before, during, and after the method illustrated above and in FIG. 1, and some operations described can be replaced, eliminated, or moved around for additional embodiments of the method.

FIGS. 2A through 2E are schematic cross-sectional views illustrating the capacitor structure 200 at different fabrication stages constructed according to aspects of one or more embodiments of the present disclosure.

Figure 2A:
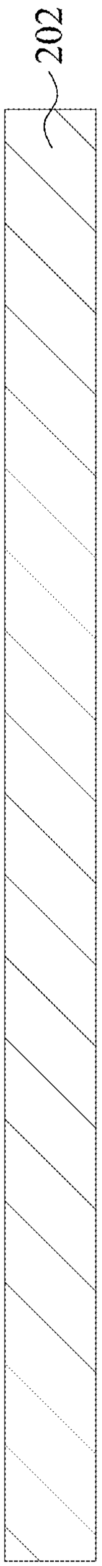
FIGS. 2A through 2E are schematic cross-sectional views illustrating a capacitor structure at different fabrication stages constructed according to aspects of one or more embodiments of the present disclosure.

Referring to FIG. 2A, a substrate 202 is received or formed, according to operation 102. The substrate 202 a bulk semiconductor substrate which includes elementary semiconductor materials, compound semiconductor materials, or alloy semiconductor materials. The substrate 202 may also be a semiconductor-on-insulator (SOI) substrate. In some embodiments, the substrate 202 can include materials commonly used in an inter-metal dielectric layer, such as silicon oxide, silicon nitride, or other suitable dielectric or insulative materials. In accordance with some exemplary embodiments, the substrate 202 is an inter-metal dielectric layer.

Figure 2B:
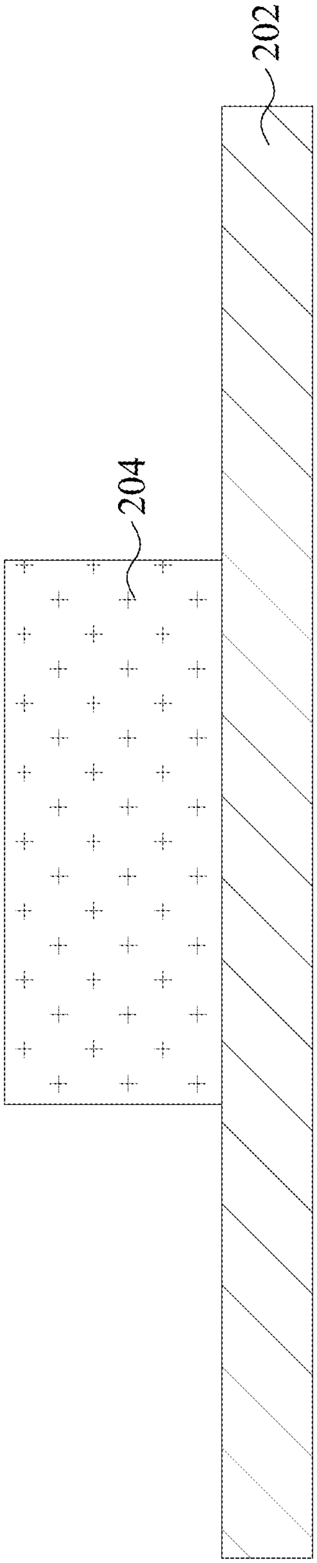

Referring to FIG. 2B, a first electrode 204 is formed over the substrate 202, according to operation 104. In some embodiments, the material of the first electrode 204 includes low resistivity metal. In some embodiments, the material of the first electrode 204 includes metal, such as molybdenum (Mo), tungsten (W), ruthenium (Ru), osmium (Os), rhodium (Rh), iridium (Ir), palladium (Pd), rhenium (Re), platinum (Pt), silver (Ag), gold (Au), aluminum (Al), titanium (Ti) and tantalum (Ta). In some embodiments, the material of the first electrode 204 includes metal compound such as titanium nitride (TiN), tantalum nitride (TaN), or other suitable metal compounds. The first electrode 204 may be a single-layered or multi-layered structure with single or combined materials as illustrated above. The first electrode 204 may be formed over the substrate 202 by physical vapor deposition (PVD), chemical vapor deposition (CVD), atomic layer deposition (ALD) or any other suitable operations.

Figure 2C:
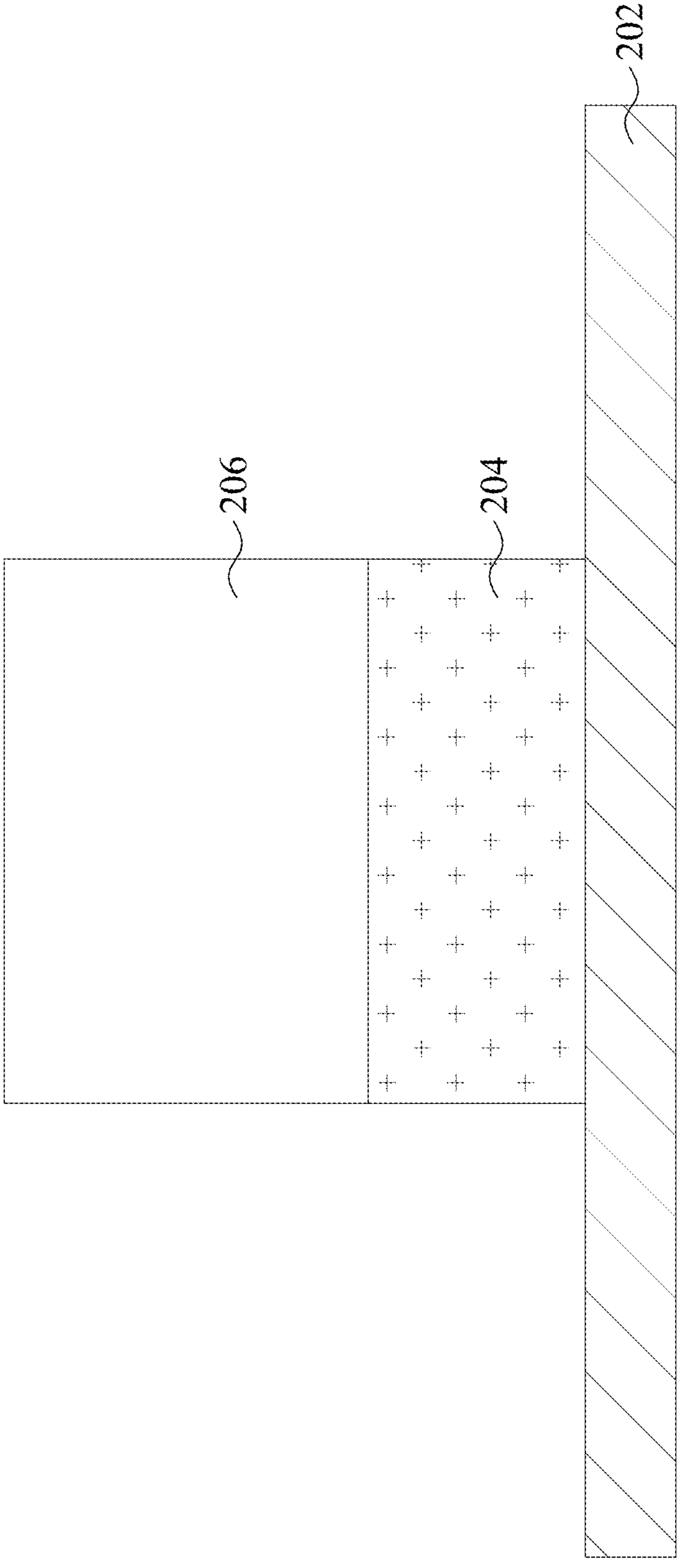

Referring to FIG. 2C, a dielectric layer 206 is formed over the substrate 202, according to operation 104. In some embodiments, the dielectric layer 206 is formed over the first electrode 204. In some embodiments, the material of the dielectric layer 206 may include high-k dielectric material (i.e., a dielectric material having a dielectric constant greater than silicon dioxide). In alternative embodiments, the material of the dielectric layer 206 may include low-k dielectric material (i.e., a dielectric material having a dielectric constant equal to or less than silicon dioxide). The dielectric layer 206 may be formed of oxide-based materials. By way of examples, the material of the dielectric layer 206 includes HfO-based dielectric materials, ZrO-based dielectric materials, TaO-based dielectric materials, TiO-based dielectric materials, HZO-based dielectric materials or any other suitable high-k or low-k dielectric materials. The dielectric layer 206 may be formed over the first electrode 204 by atomic layer deposition (ALD), chemical vapor deposition (CVD) or any other suitable operations. In some embodiments, the dielectric layer 206 is substantially conformal to a profile of the first electrode 204. In some embodiments, a thickness of the dielectric layer 206 is between about 4 nanometers (nm) and about 12 nm. In some embodiments, a Gibbs free energy (ΔG) of the dielectric layer 206 is less than −800 kJ/mol. In some embodiments, the Gibbs free energy (ΔG) of the dielectric layer 206 is less than −1000 kJ/mol.

Figure 2D:
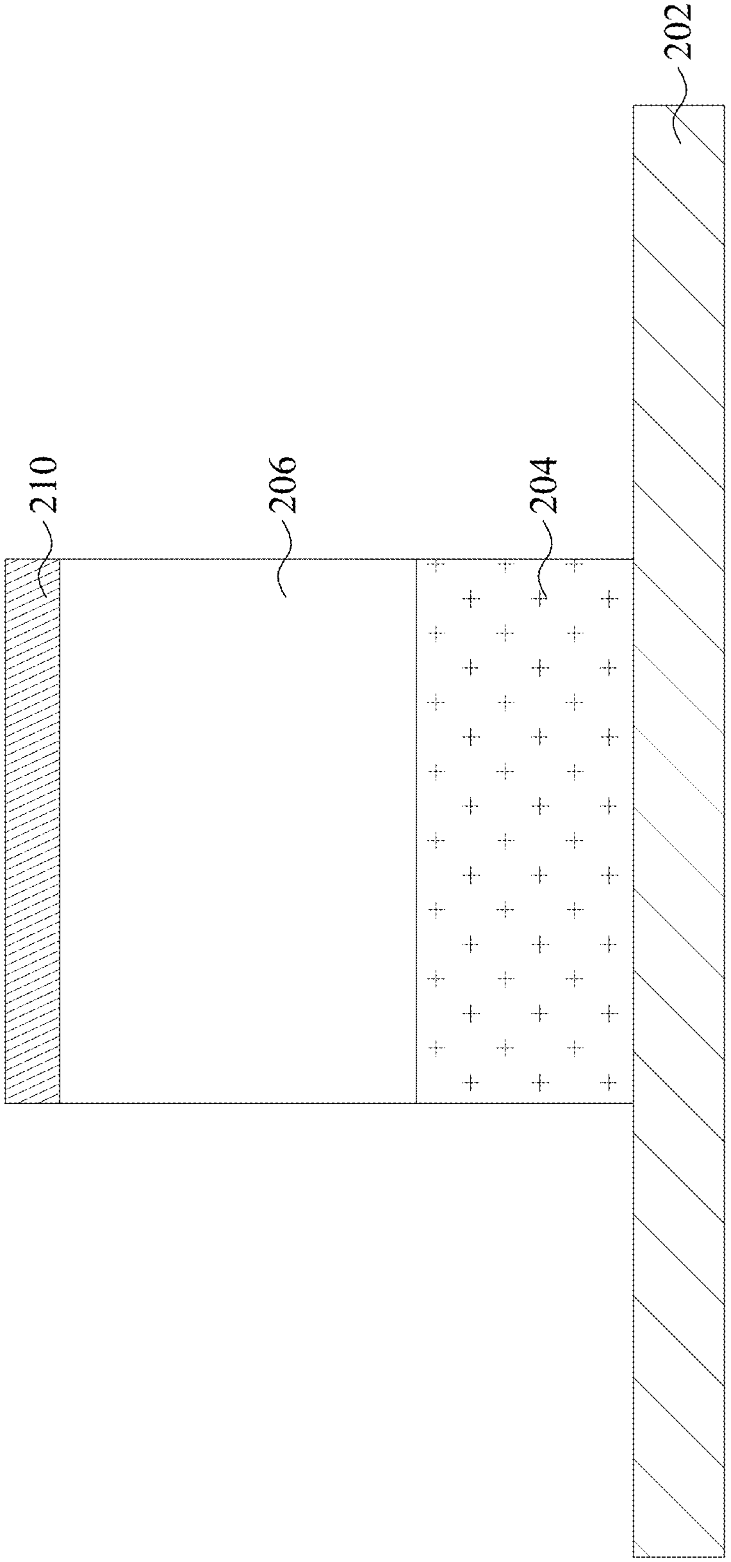

Referring to FIG. 2D, an oxygen donor layer 210 is formed. In some embodiments, the oxygen donor layer 210 is formed between the dielectric layer 206 and a second electrode (e.g., the second electrode 208 in FIG. 2E), according to operation 106. In alternative embodiments, the oxygen donor layer 210 is formed between the dielectric layer 206 and the first electrode 204. In some embodiments, the oxygen donor layer 210 is configured to dissociate oxygen to fill an oxygen vacancy in the dielectric layer 206, as discussed below. In some embodiments, a material of the oxygen donor layer 210 may include a conductive material. In some embodiments, the oxygen donor layer 210 includes conductive metal oxides. In accordance with some exemplary embodiments, the oxygen donor layer 210 includes conductive noble metal oxide. In some embodiments, the material of the oxygen donor layer 210 includes ruthenium oxide (RuOx), iridium oxide (IrOx), osmium oxide (OsOx), rhenium oxide (ReOx), and rhodium oxide (RhOx). The oxygen donor layer 210 may be formed over the dielectric layer 206 by physical vapor deposition (PVD), chemical vapor deposition (CVD), atomic layer deposition (ALD) or any other suitable operations. In some embodiments, a resistivity of the oxygen donor layer 210 is less than about 200 micro-ohm-centimeters (μΩ-cm).

In some embodiments, a thickness of the oxygen donor layer 210 is less than the thickness of the dielectric layer 206. In some embodiments, the thickness of the oxygen donor layer 210 is between about 0.5 nm and about 3 nm. In some embodiments, a Gibbs free energy (ΔG) of the oxygen donor layer 210 is greater than a Gibbs free energy (ΔG) of the dielectric layer 206. In some embodiments, the Gibbs free energy (ΔG) of the oxygen donor layer 210 is greater than or substantially equal to a Gibbs free energy (ΔG) of the first electrode 204. In some embodiments, the Gibbs free energy (ΔG) of the oxygen donor layer 210 is between 0 kJ/mol and −600 kJ/mol. In some embodiments, the Gibbs free energy (ΔG) of the oxygen donor layer 210 is between 0 kJ/mol and −500 kJ/mol. In some embodiments, a work function of the oxygen donor layer 210 is between about 3.5 eV and about 6.5 eV. In some embodiments, the work function of the oxygen donor layer 210 is between 4.5 eV and 5.5 eV.

Figure 2E:
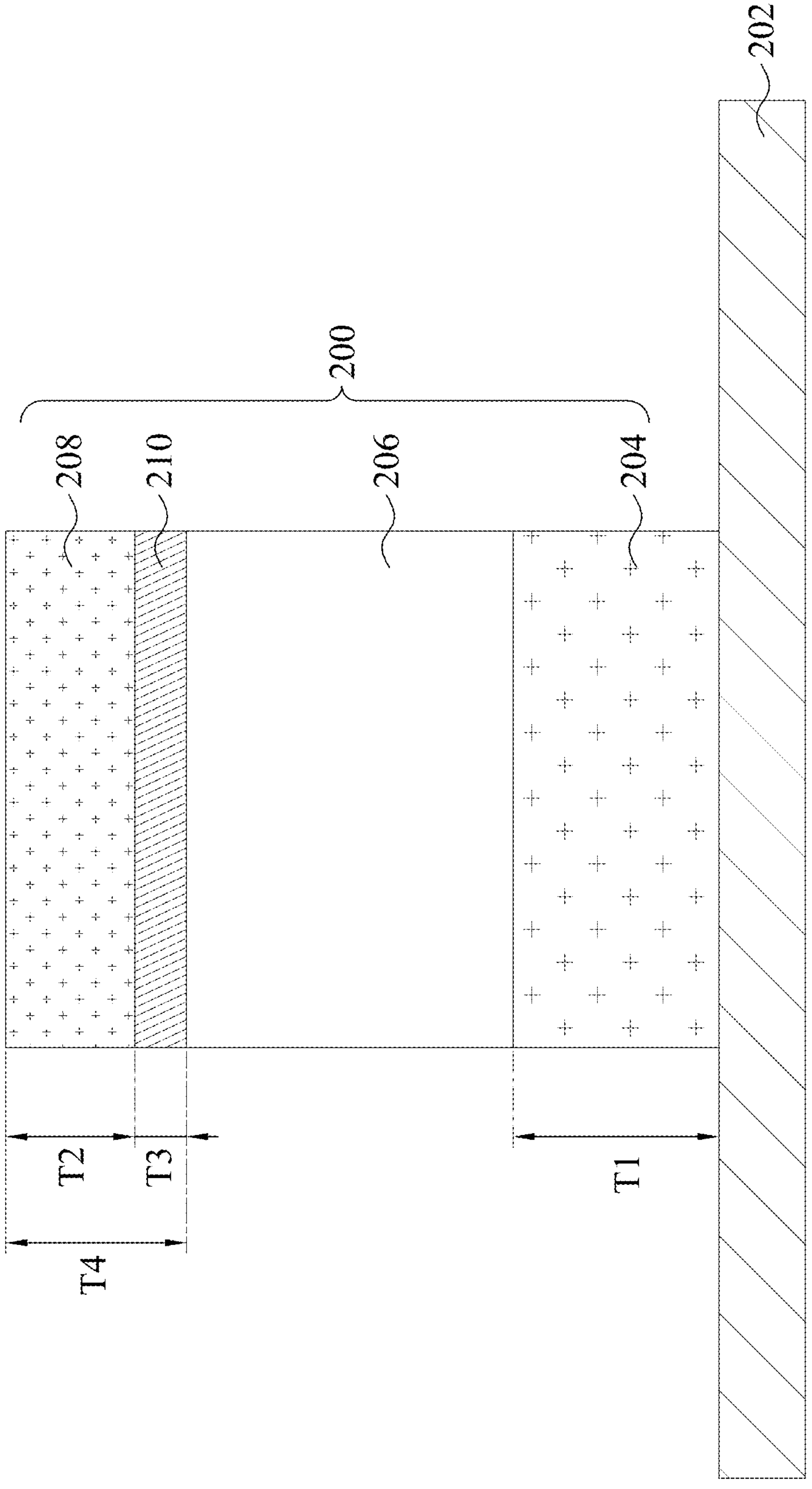

Referring to FIG. 2E, a second electrode 208 is formed over the substrate 202, according to operation 104. In some embodiments, the second electrode 208 is formed over the oxygen donor layer 210. In some embodiments, a material of the second electrode 208 includes low resistivity metal. In some embodiments, the material of the second electrode 208 includes metal, such as molybdenum (Mo), tungsten (W), ruthenium (Ru), osmium (Os), rhodium (Rh), iridium (Ir), palladium (Pd), rhenium (Re), platinum (Pt), silver (Ag), gold (Au), aluminum (Al), titanium (Ti) and tantalum (Ta). In some embodiments, the material of the second electrode 208 includes metal compound such as titanium nitride (TiN), tantalum nitride (TaN), or other suitable metal compounds. The second electrode 208 may be a single-layered or a multi-layered structure with single or combined materials as illustrated above. The second electrode 208 may be formed over the oxygen donor layer 210 by physical vapor deposition (PVD), chemical vapor deposition (CVD), atomic layer deposition (ALD) or any other suitable operation. The material and fabricating operation of the second electrode 208 can be same as or different from those of the first electrode 204. In some embodiments, a Gibbs free energy (ΔG) of the first oxygen donor layer 210 is greater than or substantially equal to the Gibbs free energy (ΔG) of the first electrode 204.

The capacitor structure 200 is thus formed. The capacitor structure 200 includes the first electrode 204, the dielectric layer 206, the oxygen donor layer 210 and the second electrode 208. The dielectric layer 206 is interposed between the first electrode 204 and the second electrode 208. The first electrode 204 and the second electrode 208 are electrically isolated from each other by the dielectric layer 206. The oxygen donor layer 210 is interposed between the dielectric layer 206 and the second electrode 208. In some embodiments, the oxygen donor layer is electrically connected to the second electrode 208. In some embodiments, the oxygen donor layer 210 and the second electrode 208 together are regarded as an upper electrode of the capacitor structure 200. In alternative embodiments, the upper electrode of the capacitor structure 200 is formed of the oxygen donor layer 210. In some embodiments, a thickness T1 of the first electrode 204 is greater than a thickness T2 of the second electrode 208. In some embodiments, a thickness T3 of the oxygen donor layer 210 is less than the thickness T2 of the second electrode 208. In some embodiments, a total thickness T4 of the thickness T2 and the thickness T3 is substantially equal to the thickness T1. In some embodiments, a total thickness of the thickness T4 and the thickness T1 is between about 10 nanometers (nm) and about 60 nm.

Figure 3A:
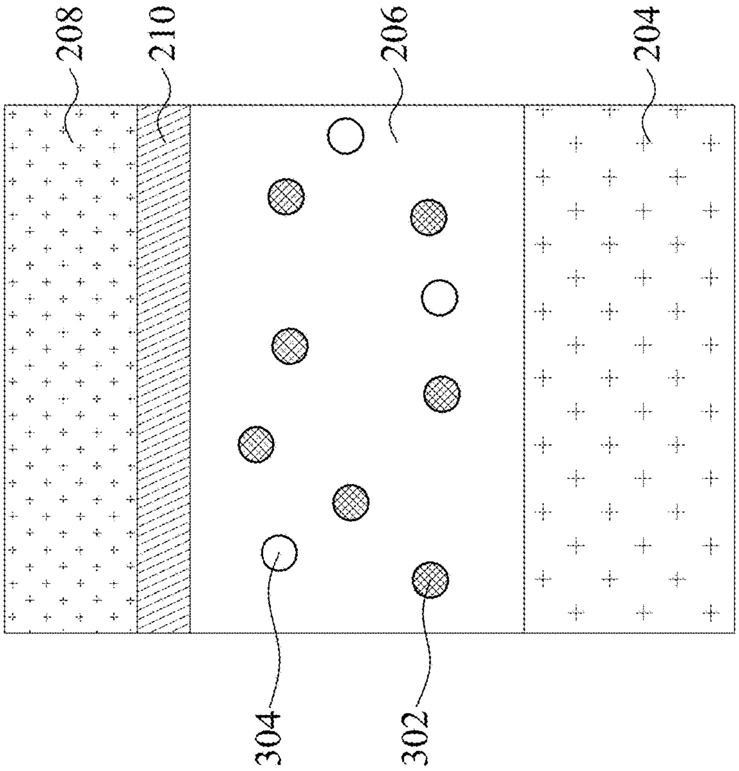
FIGS. 3A through 3G are schematic cross-sectional views illustrating a capacitor structure at different operation stages according to aspects of one or more embodiments of the present disclosure.
Figure 3B:
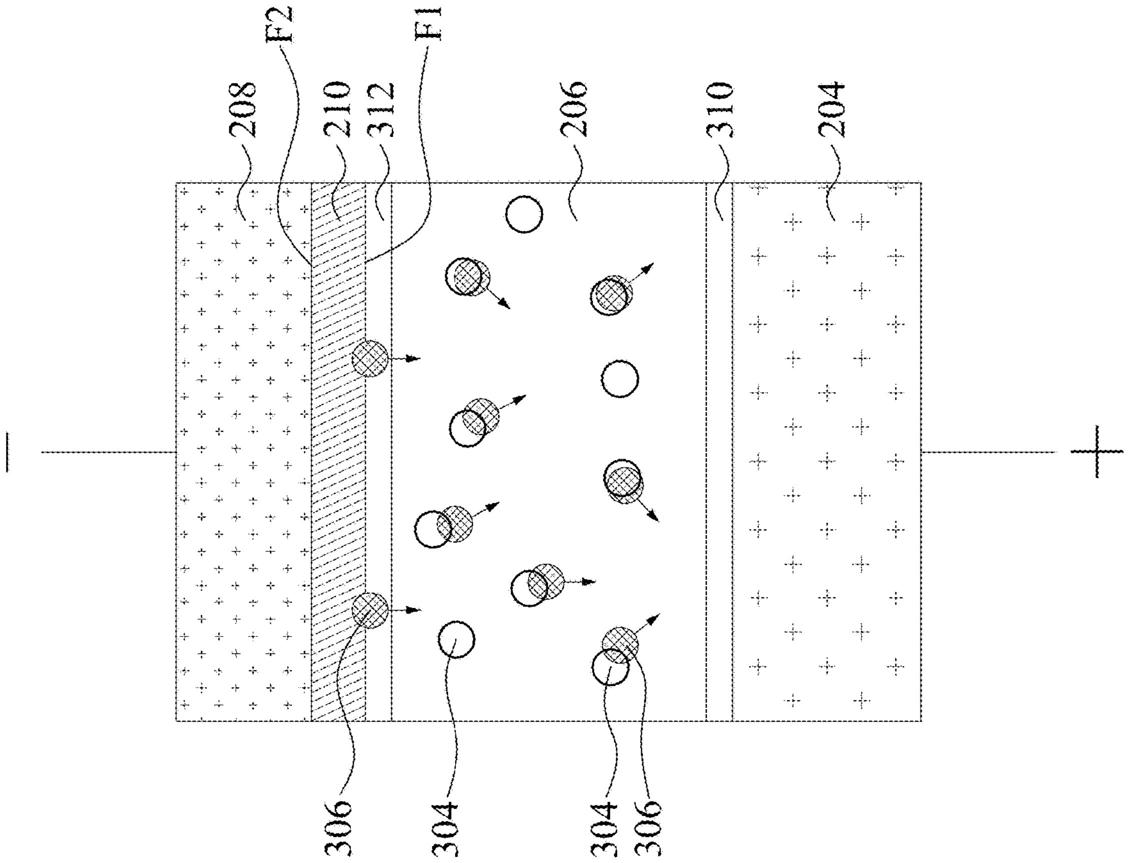
Figure 3C:
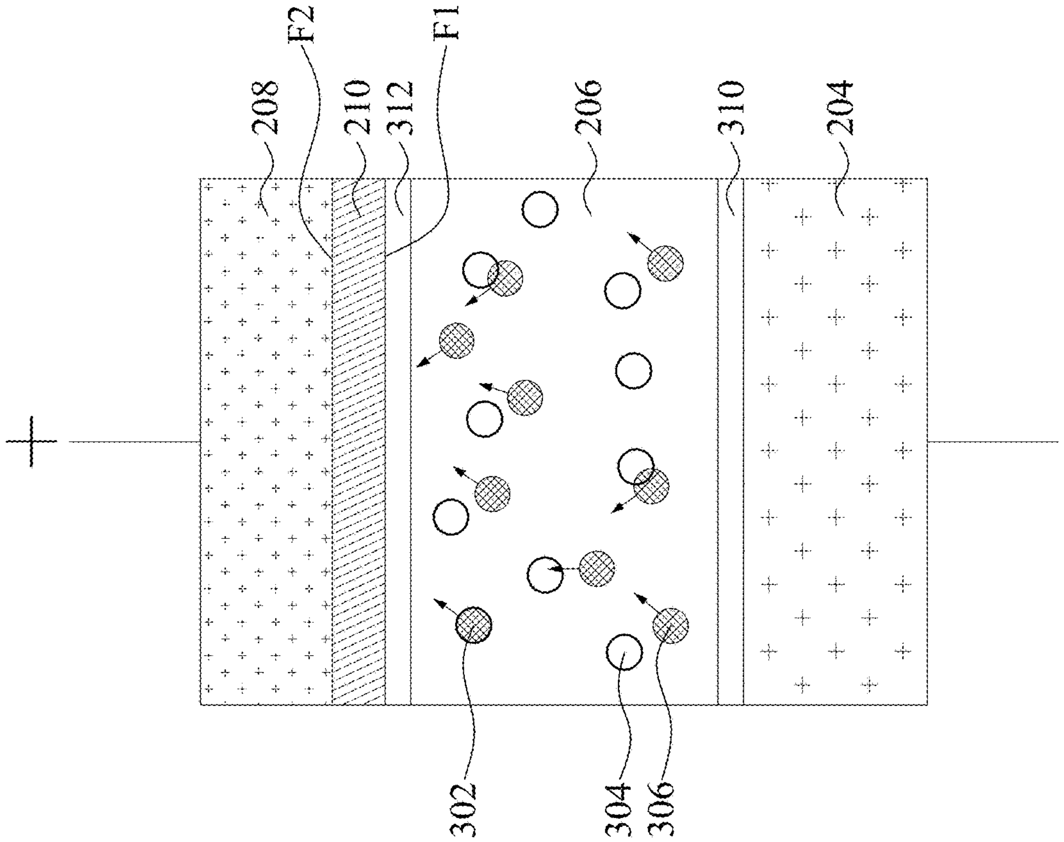
Figure 3D:
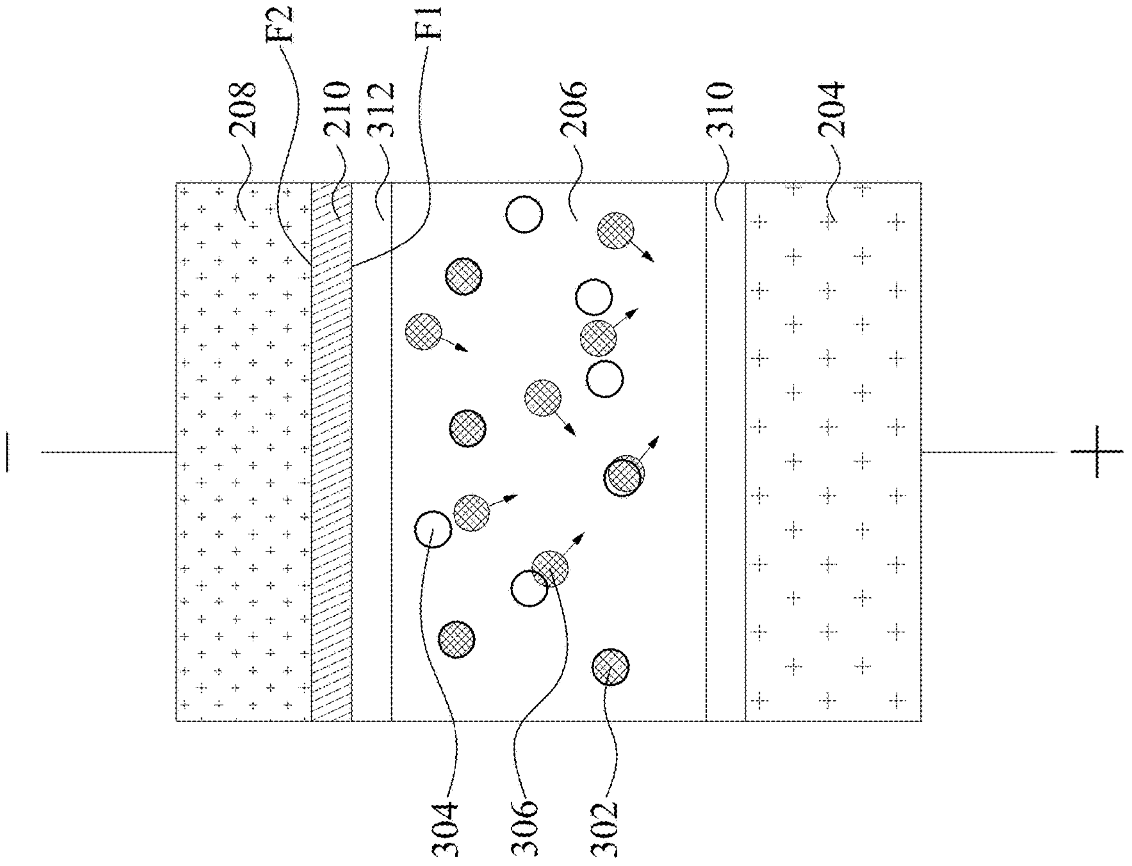
Figure 3E:
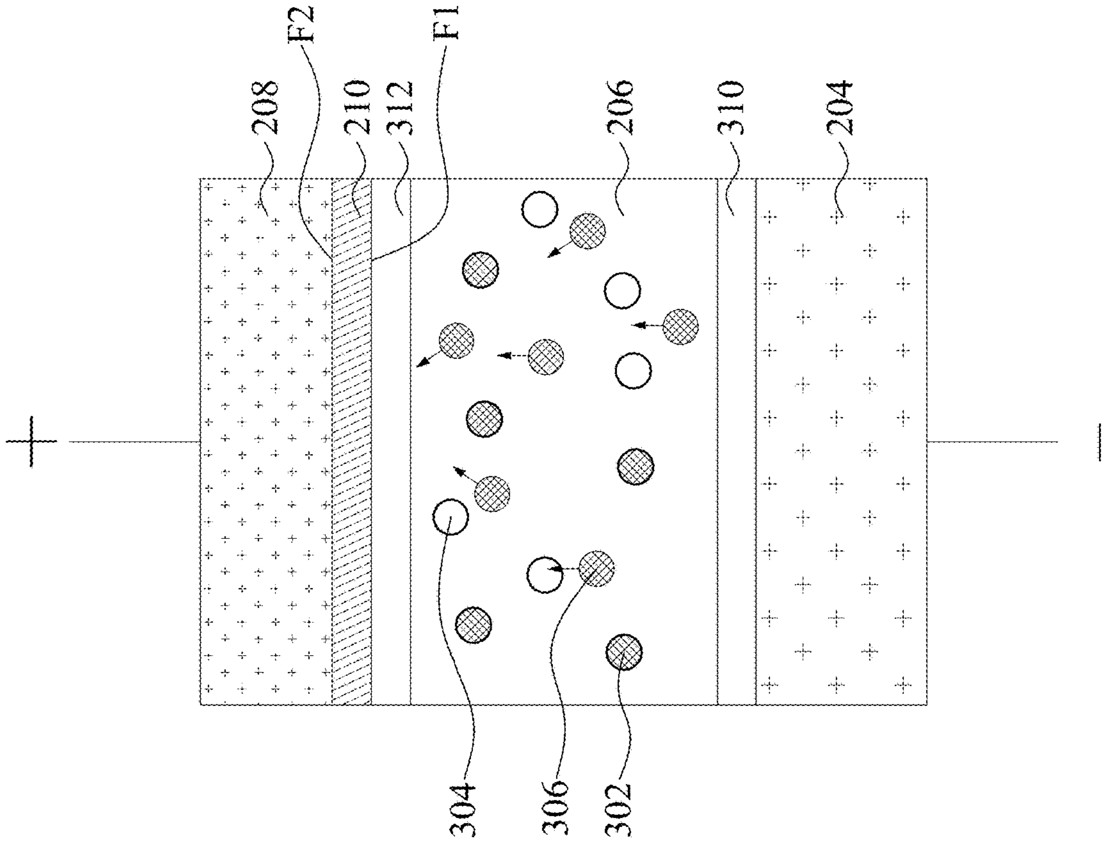
Figure 3F:
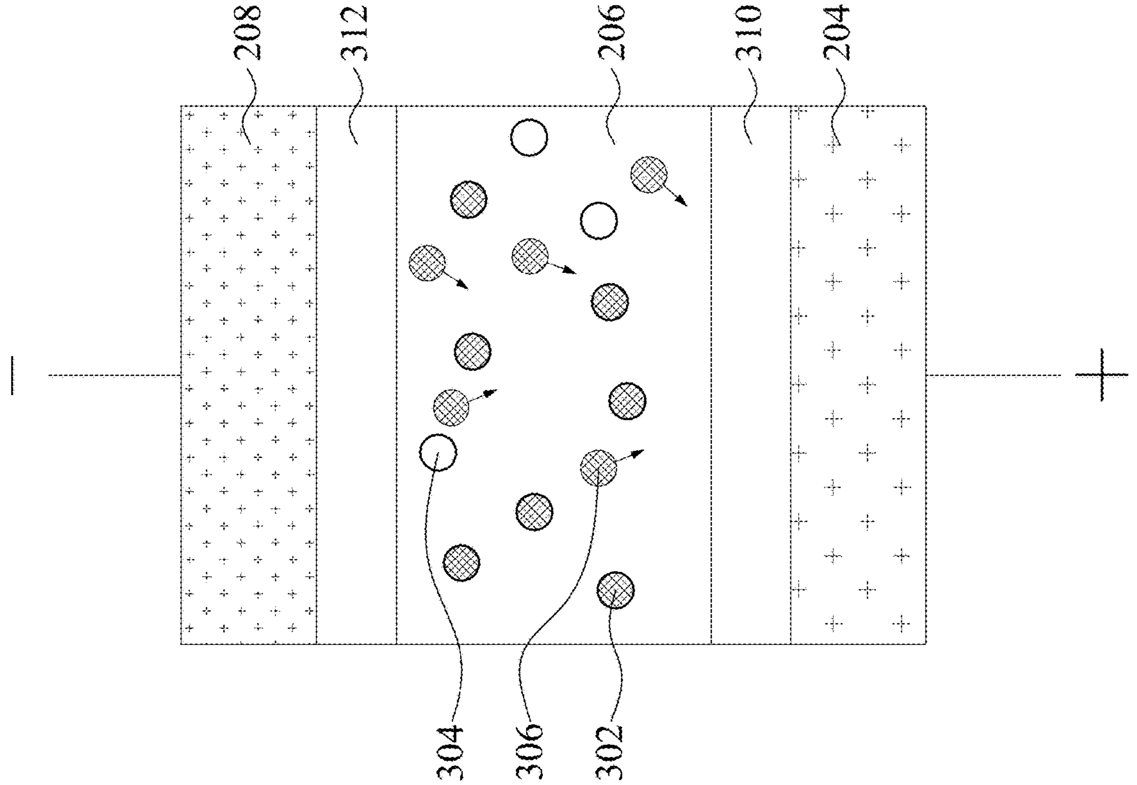
Figure 3G:
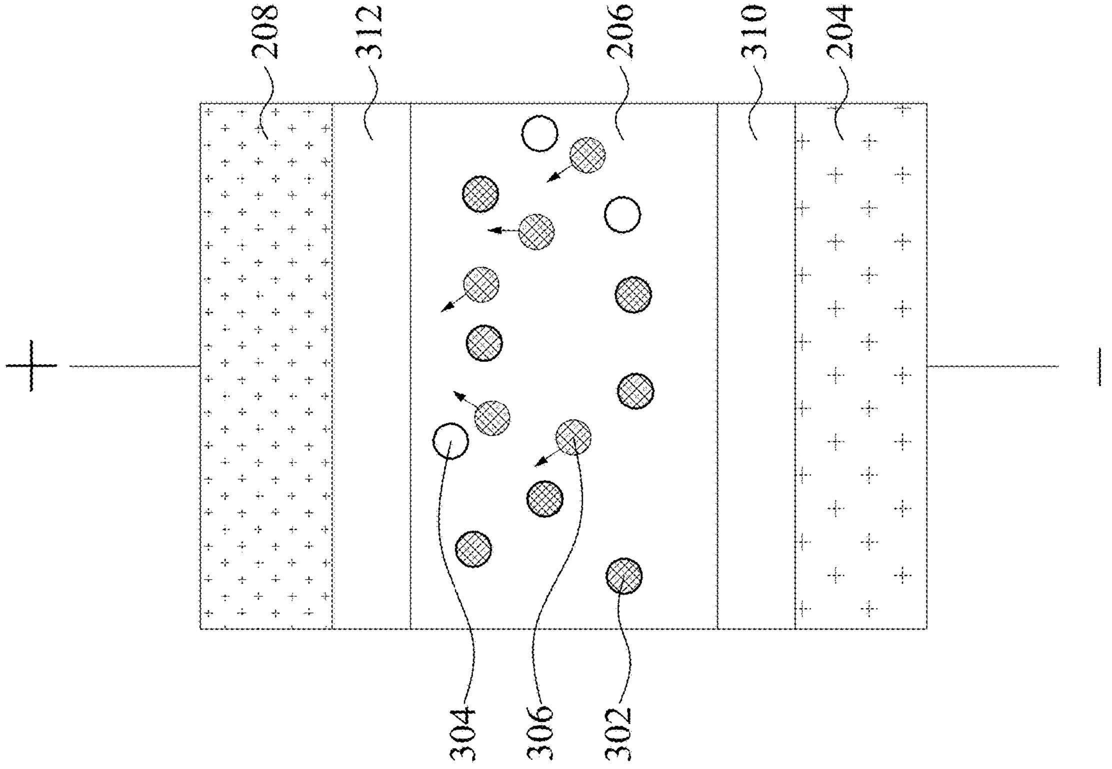

FIGS. 3A through 3G are schematic cross-sectional views illustrating the capacitor structure 200 at different operation stages according to aspects of one or more embodiments of the present disclosure. FIG. 3A represents a stage of the capacitor structure 200 before operations. FIGS. 3B and 3C represent reaction stages of the oxygen donor layer 210 of the capacitor structure 200 in an initiation state where the oxygen donor layer 210 starts to dissociate oxygen. FIGS. 3D and 3E represent reaction stages of the oxygen donor layer 210 of the capacitor structure 200 in a transition state where more oxygen in the oxygen donor layer 210 may be dissociated. FIGS. 3F and 3G represent reaction stages of the capacitor structure 200 in a final state where the oxygen donor layer 210 is reduced.

Referring to FIG. 3A, the dielectric layer 206 formed of oxide-based materials may include oxygen atoms 302. The oxygen atoms 302 may be randomly distributed in the dielectric layer 206. In some embodiments, the dielectric layer 206 may intrinsically include one or more oxygen vacancies 304. The oxygen vacancies 304 may be randomly distributed in the dielectric layer 206. The oxygen atoms 302 and the oxygen vacancies 304 of FIGS. 3A-3G are not drew to scale. Relative dimension of the oxygen atoms 302 and the oxygen vacancies 304 to the dielectric layer 206 and the exact number of the oxygen atoms 302 and the oxygen vacancies 304 are only for illustration purpose.

Referring to FIG. 3B, when a first voltage is supplied across the first electrode 204 and the second electrode 208 of the capacitor structure 200, a net positive charge may be collected on the first electrode 204 and a net negative charge may be collected on the second electrode 208. In some embodiments, when the first voltage is supplied, a net positive charge may be collected on the first electrode 204, while the second electrode 208 is connected to electrical ground. In alternative embodiments, when the first voltage is supplied, the first electrode 204 is connected to electrical ground, while a net negative charge may be collected on the second electrode 208. One or more of the oxygen atoms 302 in the dielectric layer 206 may be dissociated into oxygen ions 306. The oxygen ions 306 in the dielectric layer 206 may be attracted toward the first electrode 204. Thus, one or more oxygen vacancies 304 are formed in the dielectric layer 206. In some embodiments, the oxygen ions 306 generated from the dielectric layer 206 may react with the first electrode 204. The reaction may form an interfacial layer 310 between the dielectric layer 206 and the first electrode 204. In some embodiments, a metal atom of the interfacial layer is same as a metal atom of the first electrode 204.

Still referring to FIG. 3B, the oxygen donor layer 210 may provide oxygen to the dielectric layer 206. The oxygen donor layer 210 formed of oxide-based materials includes oxygen ions 306. In some embodiments, one or more of the oxygen ions 306 in the oxygen donor layer 210 may be dissociated. The oxygen ions 306 in the oxygen donor layer 210 may be attracted toward the first electrode 204. Thus, the oxygen ions 306 generated from the oxygen donor layer 210 may fill one or more of the oxygen vacancies 304 in the dielectric layer 206. In some embodiments, the oxygen donor layer 210 has a reduced thickness after the dissociation of the oxygen ion 306 from the oxygen donor layer 210. In some embodiments, a conductive layer 312 may be formed between the oxygen donor layer 210 and the dielectric layer 206. The conductive layer 312 may be formed by a reduction reaction due to the dissociation of the oxygen. In some embodiments, a metal atom of the conductive layer 312 is same as a metal atom of the oxygen donor layer 210. In some embodiments, the conductive layer 312 includes a noble metal. For example, the conductive layer may include ruthenium (Ru), iridium (Ir), osmium (Os), rhenium (Re), and rhodium (Rh). At this stage, an oxygen concentration of the oxygen donor layer 210 increases along a thickness direction from a first surface F1 proximal to the dielectric layer 206 to a second surface F2 proximal to the second electrode 208.

Referring to FIG. 3C, when a second voltage is supplied across the first electrode 204 and the second electrode 208 of the capacitor structure 200, a net negative charge may be collected on the first electrode 204 and a net positive charge may be collected on the second electrode 208. In some embodiments, when the second voltage is supplied, a net positive charge may be collected on the second electrode 208, while the first electrode 204 is connected to electrical ground. In alternative embodiments, when the second voltage is supplied, the second electrode 208 is connected to electrical ground, while a net negative charge may be collected on the first electrode 204. One or more of the oxygen atoms 302 in the dielectric layer 206 may be dissociated into oxygen ions 306, and one or more oxygen vacancies 304 are formed in the dielectric layer 206. The oxygen ions 306 in the dielectric layer 206 may be attracted toward the second electrode 208 under the second voltage. In some embodiments, the oxygen ions 306 in the dielectric layer 206 may be less likely to oxidize the conductive layer 312 since a Gibbs free energy (ΔG) of the oxygen donor layer 210 is greater than a Gibbs free energy (ΔG) of the dielectric layer 206.

Referring to FIG. 3D, a third voltage is supplied across the first electrode 204 and the second electrode 208. A net positive charge may be collected on the first electrode 204 and a net negative charge may be collected on the second electrode 208. In some embodiments, a net positive charge may be collected on the first electrode 204, while the second electrode 208 is connected to electrical ground. In alternative embodiments, the first electrode 204 is connected to electrical ground, while a net negative charge may be collected on the second electrode 208. More of the oxygen atoms 302 in the dielectric layer 206 may be dissociated into oxygen ions 306 and more oxygen vacancies 304 are formed in the dielectric layer 206. In some embodiments, more oxygen ions 306 generated from the dielectric layer 206 may react with the first electrode 204. The interfacial layer 310 between the dielectric layer 206 and the first electrode 204 may grow thicker. In some embodiments, more of the oxygen ions 306 in the oxygen donor layer 210 may be dissociated. Thus, more of the oxygen ions 306 generated from the oxygen donor layer 210 may fill more of the oxygen vacancies 304 in the dielectric layer 206. The conductive layer 312 formed between the oxygen donor layer 210 and the dielectric layer 206 may grow thicker. At this stage, the oxygen concentration of the oxygen donor layer 210 increases along the thickness direction from the first surface F1 proximal to the dielectric layer 206 to the second surface F2 proximal to the second electrode 208.

Referring to FIG. 3E, a fourth voltage is supplied across the first electrode 204 and the second electrode 208. A net negative charge may be collected on the first electrode 204 and a net positive charge may be collected on the second electrode 208. In some embodiments, a net positive charge may be collected on the second electrode 208, while the first electrode 204 is connected to electrical ground. In alternative embodiments, the second electrode 208 is connected to electrical ground, while a net negative charge may be collected on the first electrode 204. The oxygen ions 306 in the dielectric layer 206 may be attracted toward the second electrode 208 under the fourth voltage. In some embodiments, the oxygen ions 306 in the dielectric layer 206 may be less likely to oxidize the conductive layer 312 since the Gibbs free energy (ΔG) of the oxygen donor layer 210 is greater than the Gibbs free energy (ΔG) of the dielectric layer 206. In some embodiments, the thickness of the conductive layer 312 under the fourth voltage is substantially equal to the thickness of the conductive layer 312 under the third voltage. In some embodiments, the thickness of the interfacial layer 310 under the fourth voltage is substantially equal to the thickness of the interfacial layer 310 under the third voltage.

Referring to FIG. 3F, a fifth voltage is supplied across the first electrode 204 and the second electrode 208. A net positive charge may be collected on the first electrode 204 and a net negative charge may be collected on the second electrode 208. In some embodiments, a net positive charge may be collected on the first electrode 204, while the second electrode 208 is connected to electrical ground. In alternative embodiments, the first electrode 204 is connected to electrical ground, while a net negative charge may be collected on the second electrode 208. In some embodiments, more oxygen ions 306 generated from the dielectric layer 206 may react with the first electrode 204. The interfacial layer 310 between the dielectric layer 206 and the first electrode 204 may grow thicker. Furthermore, more oxygen ions 306 in the oxygen donor layer 210 may be dissociated. In some embodiments, the entire oxygen donor layer 210 is transformed into the conductive layer 312. In other words, the oxygen donor layer 210 is reduced to the conductive layer 312. The oxygen ions 306 generated from the oxygen donor layer 210 may fill more oxygen vacancies 304 in the dielectric layer 206. The thickness of the conductive layer 312 at this stage may be less than or substantially equal to the thickness of the oxygen donor layer 210 of FIG. 3A. The thickness of the conductive layer 312 at this stage may be about 0.5 nm to about 1 nm less than the thickness of the oxygen donor layer 210.

Referring to FIG. 3G, a sixth voltage is supplied across the first electrode 204 and the second electrode 208. A net negative charge may be collected on the first electrode 204 and a net positive charge may be collected on the second electrode 208. In some embodiments, a net positive charge may be collected on the second electrode 208, while the first electrode 204 is connected to electrical ground. In alternative embodiments, the second electrode 208 is connected to electrical ground, while a net negative charge may be collected on the first electrode 204. The oxygen ions 306 in the dielectric layer 206 may be attracted toward the second electrode 208 under the sixth voltage. In some embodiments, more oxygen vacancies 304 in the dielectric layer 206 are filled during the movement of the oxygen ions 306. In alternative embodiments, if a thickness of the oxygen donor layer 210 is greater than about 2 nm, an upper portion of the oxygen donor layer 210 contacting the second electrode 208 may not be reduced to the conductive layer 312.

A state of the capacitor structure 200 may be varied depending on different applications. In some embodiments, the capacitor structure 200 may be remained in a state where the oxygen concentration of the oxygen donor layer 210 increases along the thickness direction from the first surface F1 proximal to the dielectric layer 206 to the second surface F2 proximal to the second electrode 208. In alternative embodiments, the capacitor structure 200 may be remained in a state where the entire oxygen donor layer 210 is transformed into the conductive layer 312.

The proposed structures provide advantages. During operation of the capacitor structure, oxygen vacancies are generated in the dielectric layer. Oxygen vacancies may act as defects or as a charge trapping center, which may cause leakage current and reduce a durability of the capacitor structure 200. A presence of the oxygen donor layer 210 may provide oxygen to the oxygen vacancies in the dielectric layer 206. Thus, a density of the oxygen vacancies in the dielectric layer 206 may be reduced. In some embodiments, an amount of the oxygen vacancies in the dielectric layer 206 is reduced by about 10% to 35%. The presence of the oxygen donor layer 210 may also provide a clear interface between the dielectric layer 206 and the second electrode 208, which may reduce the leakage current and increase the durability of the capacitor structure 200. The oxygen donor layer 210 may be configured as an amorphous substrate for forming the dielectric layer 206. Thus, a lower leakage current can be achieved due to less grain formation. In cases where the oxygen donor layer 210 is absent, the capacitor structure 200 may be operated for about $10^8$ cycles. With the presence of the oxygen donor layer 210, the capacitor structure 200 may be operated for about $10^9$ cycles to $10^{18}$ cycles. Furthermore, the proposed structures may be used in various applications, such as an embedded MIM capacitor application. The proposed structures may provide capabilities of energy storage, signal filtering, power bussing, or power amplification.

The structures of the present disclosure are not limited to the above-mentioned embodiments and may have other different embodiments. To simplify the description and for the convenience of comparison between each of the embodiments of the present disclosure, the identical components in each of the following embodiments are marked with identical numerals. For making it easier to compare the difference between the embodiments, the following description will detail the dissimilarities among different embodiments and the identical features will not be repeated.

Figure 4A:
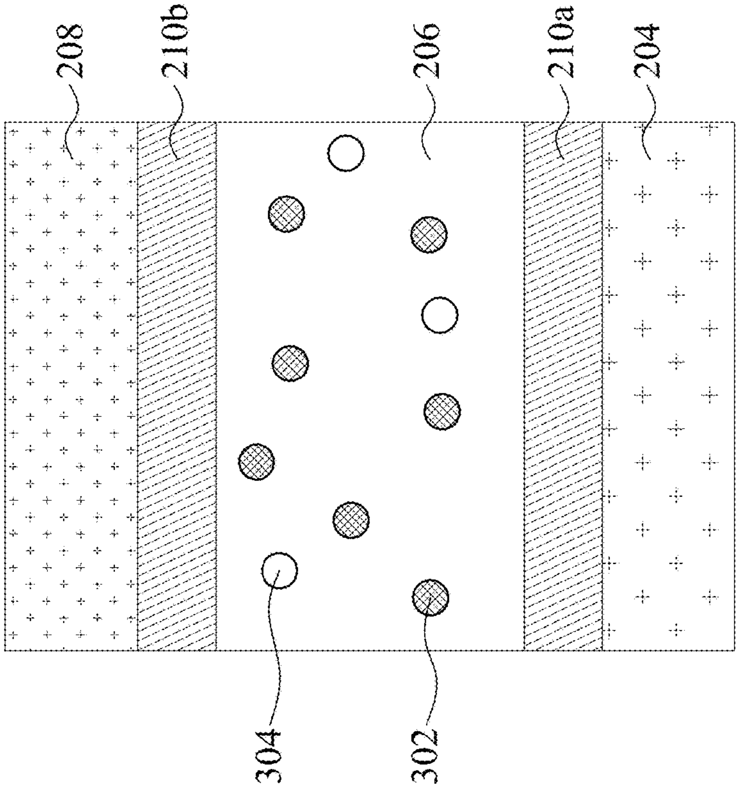
FIGS. 4A through 4G are schematic cross-sectional views illustrating a capacitor structure at different operation stages according to aspects of one or more embodiments of the present disclosure.
Figure 4B:
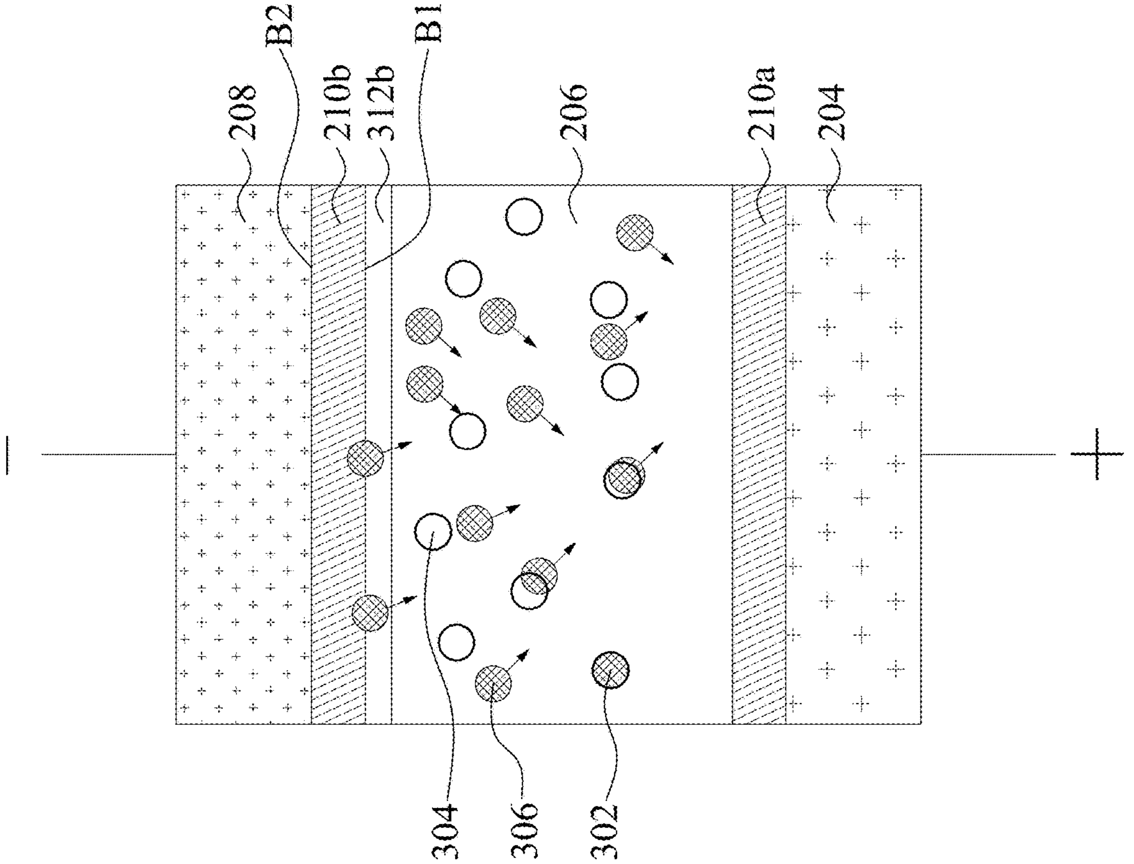
Figure 4C:
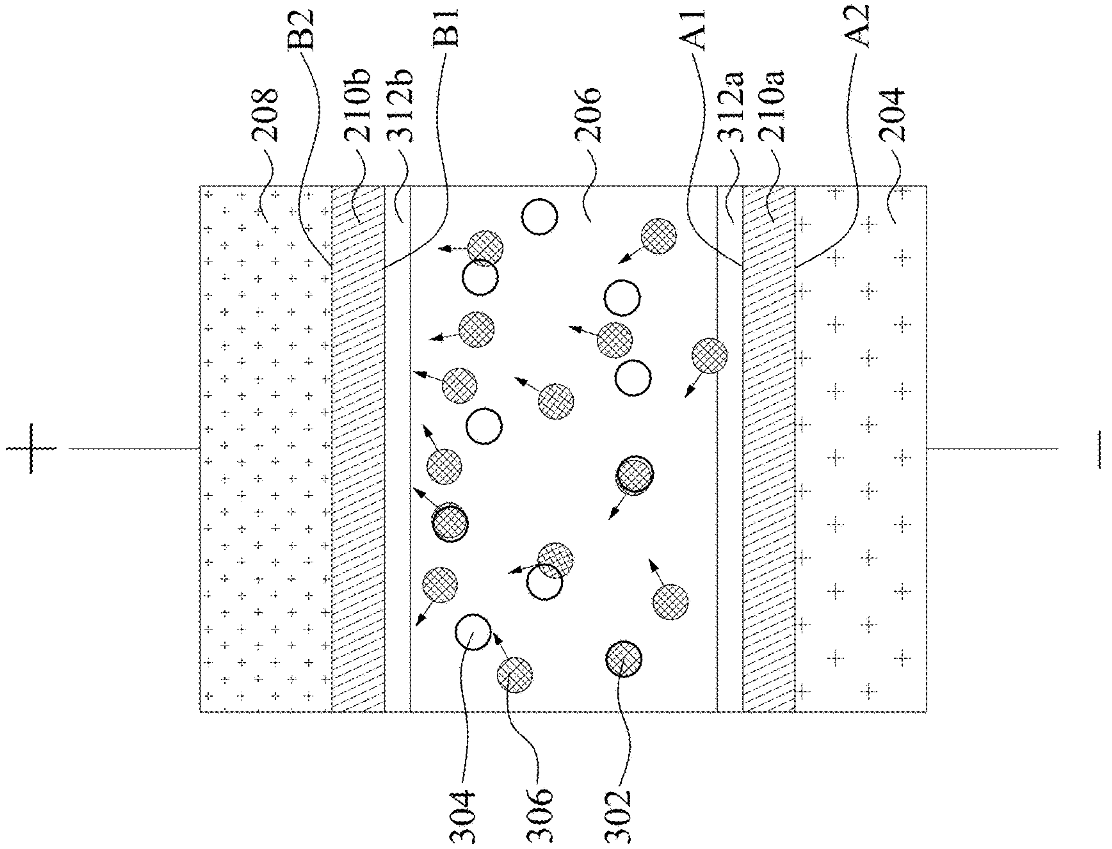
Figure 4D:
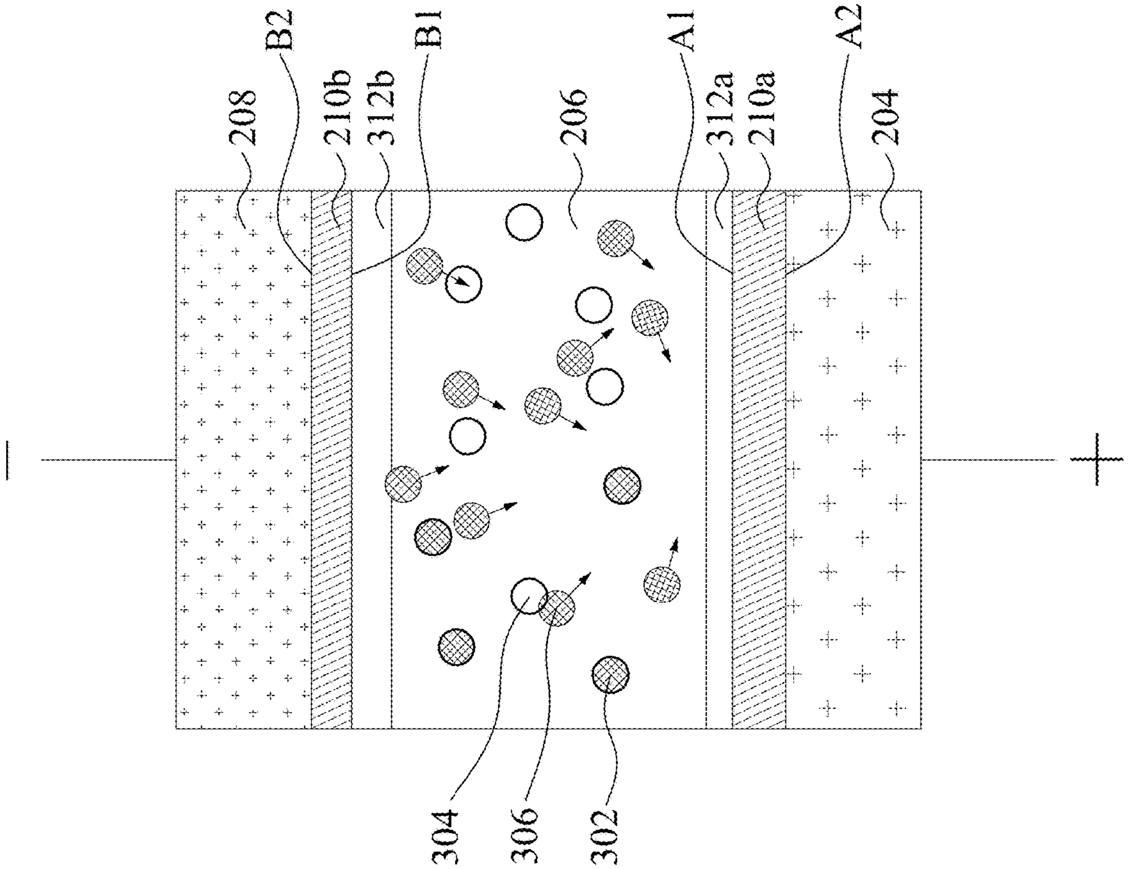
Figure 4E:
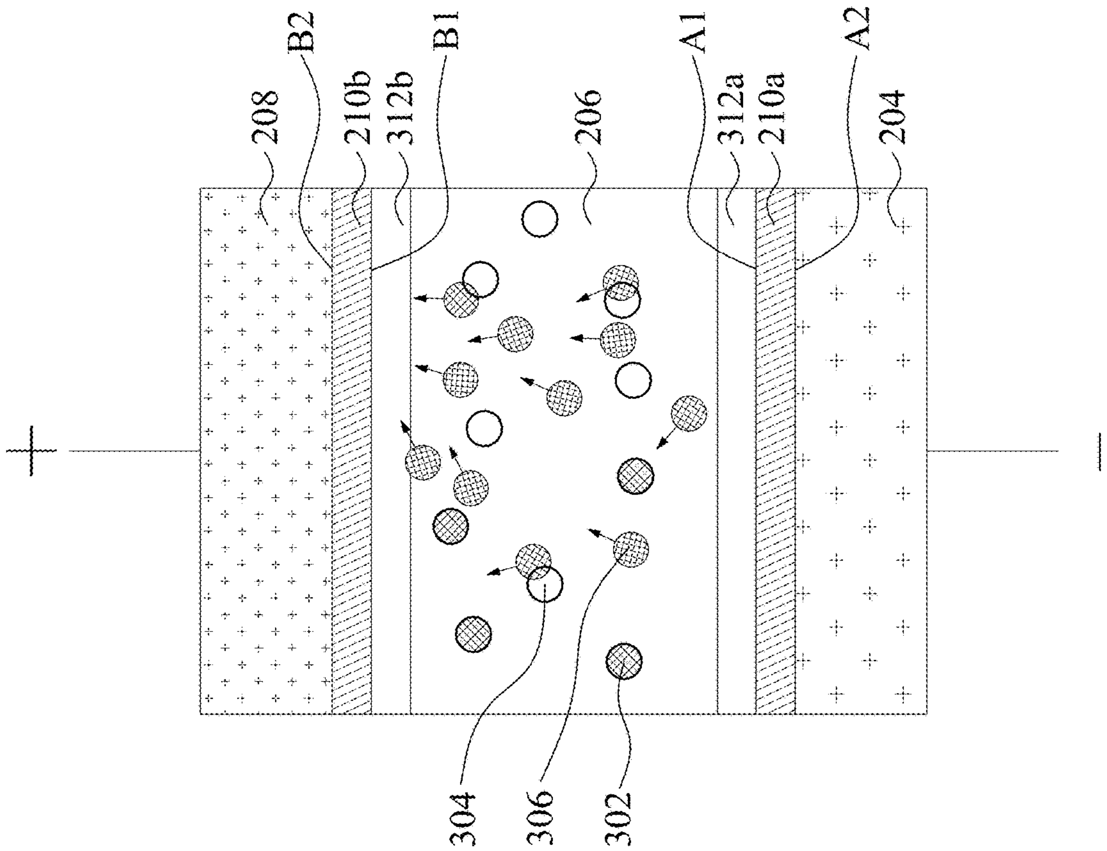
Figure 4F:
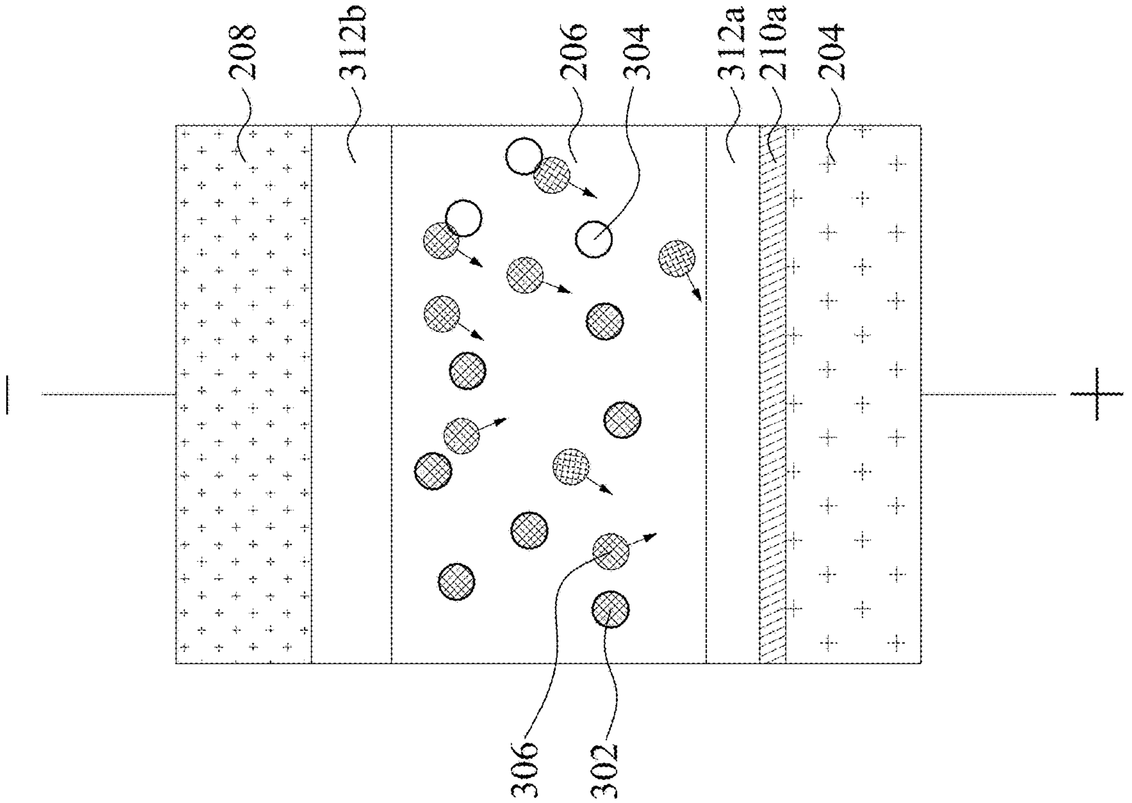
Figure 4G:
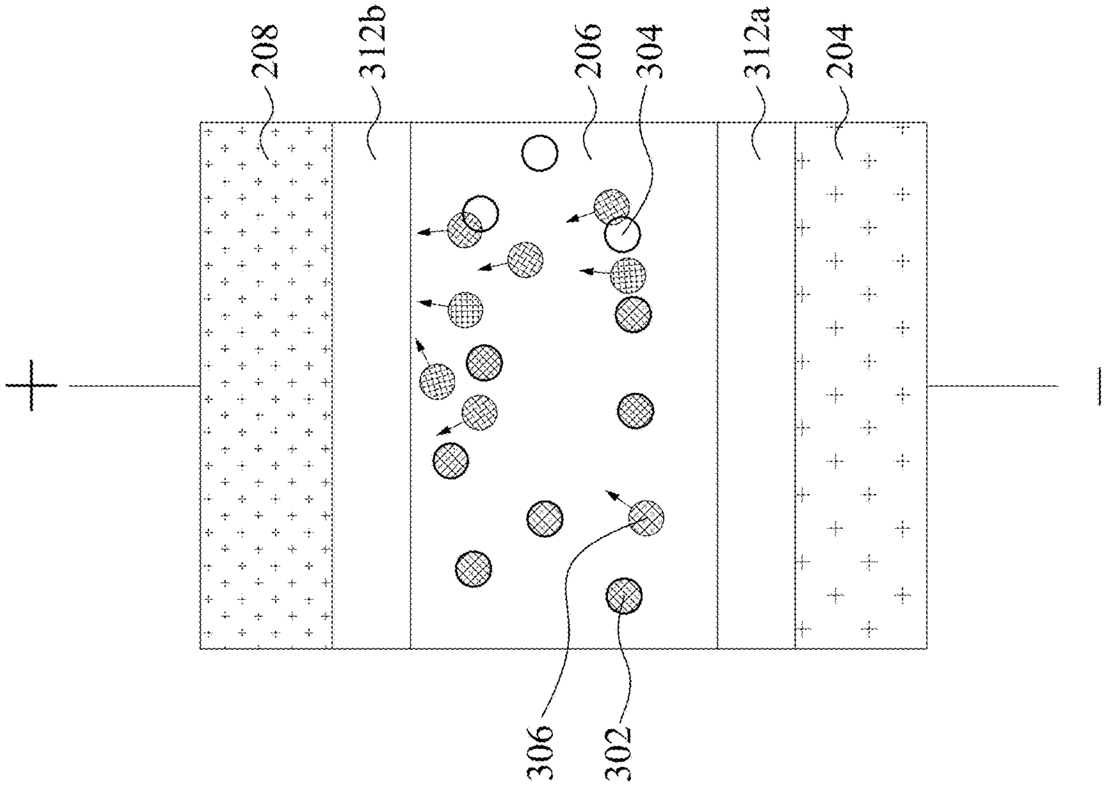

FIGS. 4A through 4G are schematic cross-sectional views illustrating a capacitor structure 300 at different operation stages according to aspects of one or more embodiments of the present disclosure. FIG. 4A represents a stage of the capacitor structure 300 before operations. FIGS. 4B and 4C represent reaction stages of a first oxygen donor layer 210*a* and a second oxygen donor layer 210*b* of the capacitor structure 300 in an initiation state where the first and second oxygen donor layers 210*a*, 210*b* start to dissociate oxygen. FIGS. 4D and 4E represent reaction stages of the first and second oxygen donor layers 210*a*, 210*b* of the capacitor structure 300 in a transition state where more oxygen in the first and second oxygen donor layers 210*a*, 210*b* may be dissociated. FIGS. 4F and 4G represent reaction stages of the capacitor structure 300 in a final state where the oxygen donor layer 210 is reduced.

Referring to FIG. 4A, the capacitor structure 300 may have a first oxygen donor layer 210*a* disposed between the first electrode 204 and the dielectric layer 206, and a second oxygen donor layer 210*b* disposed between the second electrode 208 and the dielectric layer 206. The material and fabricating operation of the first oxygen donor layer 210*a* and the second oxygen donor layer 210*b* can be similar to those of the oxygen donor layer 210. As previously discussed, oxygen atoms 302 may be randomly distributed in the dielectric layer 206. In some embodiments, the dielectric layer 206 may intrinsically include one or more oxygen vacancies 304. The oxygen vacancies 304 may be randomly distributed in the dielectric layer 206. The oxygen atoms 302 and the oxygen vacancies 304 of FIGS. 4A-4G are not drew to scale. Relative dimension of the oxygen atoms 302 and the oxygen vacancies 304 to the dielectric layer 206 and the exact number of the oxygen atoms 302 and the oxygen vacancies 304 are only for illustration purpose.

Referring to FIG. 4B, when a first voltage is supplied across the first electrode 204 and the second electrode 208 of the capacitor structure 300, a net positive charge may be collected on the first electrode 204 and a net negative charge may be collected on the second electrode 208. In some embodiments, a net positive charge may be collected on the first electrode 204, while the second electrode 208 is connected to electrical ground. In alternative embodiments, the first electrode 204 is connected to electrical ground, while a net negative charge may be collected on the second electrode 208. One or more of the oxygen atoms 302 in the dielectric layer 206 may be dissociated into oxygen ions 306. The oxygen ions 306 in the dielectric layer 206 may be attracted toward the first electrode 204. Thus, one or more of the oxygen vacancies 304 are formed in the dielectric layer 206. However, the oxygen ions 306 generated from the dielectric layer 206 may be unable to react with the first electrode 204 due to a presence of the first oxygen donor layer 210*a*. Thus, no interfacial layer may be formed between the dielectric layer 206 and the first electrode 204.

Still referring to FIG. 4B, the second oxygen donor layer 210*b* may provide oxygen to the dielectric layer 206. In some embodiments, one or more of the oxygen ions 306 in the second oxygen donor layer 210*b* may be dissociated. The oxygen ions 306 in the second oxygen donor layer 210*b* may be attracted toward the first electrode 204. Thus, the oxygen ions 306 generated from the second oxygen donor layer 210*b* may fill one or more of the oxygen vacancies 304 in the dielectric layer 206. In some embodiments, a second conductive layer 312*b* may be formed between the second oxygen donor layer 210*b* and the dielectric layer 206. The second conductive layer 312*b* may be formed by a reduction reaction due to the dissociation of the oxygen. At this stage, an oxygen concentration of the second oxygen donor layer 210*b* increases along a thickness direction from a first surface B1 proximal to the dielectric layer 206 to a second surface B2 proximal to the second electrode 208.

Referring to FIG. 4C, when a second voltage is supplied across the first electrode 204 and the second electrode 208 of the capacitor structure 300, a net negative charge may be collected on the first electrode 204 and a net positive charge may be collected on the second electrode 208. In some embodiments, a net positive charge may be collected on the second electrode 208, while the first electrode 204 is connected to electrical ground. In alternative embodiments, the second electrode 208 is connected to electrical ground, while a net negative charge may be collected on the first electrode 204. One or more of the oxygen atoms 302 in the dielectric layer 206 may be dissociated into oxygen ions 306, and one or more of the oxygen vacancies 304 are formed in the dielectric layer 206. The oxygen ions 306 in the dielectric layer 206 may be attracted toward the second electrode 208 under the second voltage. In some embodiments, the oxygen ions 306 in the dielectric layer 206 may be less likely to oxidize the conductive layer 312 since a Gibbs free energy ($\Delta G$) of the oxygen donor layer 210 is greater than a Gibbs free energy ($\Delta G$) of the dielectric layer 206.

Still referring to FIG. 4C, the first oxygen donor layer 210*a* may also provide oxygen to the dielectric layer 206. In some embodiments, one or more of the oxygen ions 306 in the first oxygen donor layer 210*a* may be dissociated. The oxygen ions 306 in the first oxygen donor layer 210*a* may be attracted toward the second electrode 208. Thus, the oxygen ions 306 generated from the first oxygen donor layer 210*a* may fill one or more of the oxygen vacancies 304 in the dielectric layer 206. In some embodiments, a first conductive layer 312*a* may be formed between the first oxygen donor layer 210*a* and the dielectric layer 206. The first conductive layer 312*a* may be formed by a reduction reaction due to the dissociation of the oxygen. At this stage, an oxygen concentration of the first oxygen donor layer 210*a* increases along a thickness direction from the first surface A1 proximal to the dielectric layer 206 to the second surface A2 proximal to the first electrode 204.

Referring to FIG. 4D, a third voltage is supplied across the first electrode 204 and the second electrode 208. A net positive charge may be collected on the first electrode 204 and a net negative charge may be collected on the second electrode 208. In some embodiments, a net positive charge may be collected on the first electrode 204, while the second electrode 208 is connected to electrical ground. In alternative embodiments, the first electrode 204 is connected to electrical ground, while a net negative charge may be collected on the second electrode 208. More of the oxygen atoms 302 in the dielectric layer 206 may be dissociated into oxygen ions 306, and more of the oxygen vacancies 304 are formed in the dielectric layer 206. In some embodiments, more of the oxygen ions 306 in the second oxygen donor layer 210*b* may be dissociated. Thus, more of the oxygen ions 306 generated from the second oxygen donor layer 210*b* may fill more of the oxygen vacancies 304 in the dielectric layer 206. The second conductive layer 312*b* formed between the second oxygen donor layer 210*b* and the dielectric layer 206 may grow thicker. At this stage, the oxygen concentration of the second oxygen donor layer 210*b* increases along the thickness direction from the first surface B1 proximal to the dielectric layer 206 to the second surface B2 proximal to the second electrode 208.

Referring to FIG. 4E, a fourth voltage is supplied across the first electrode 204 and the second electrode 208. A net negative charge may be collected on the first electrode 204 and a net positive charge may be collected on the second electrode 208. In some embodiments, a net positive charge may be collected on the second electrode 208, while the first electrode 204 is connected to electrical ground. In alternative embodiments, the second electrode 208 is connected to electrical ground, while a net negative charge may be collected on the first electrode 204. The oxygen ions 306 in the dielectric layer 206 may be attracted toward the second electrode 208 under the fourth voltage. In some embodiments, more of the oxygen ions 306 in the first oxygen donor layer 210*a* may be dissociated. Thus, more of the oxygen ions 306 generated from the first oxygen donor layer 210*a* may fill more of the oxygen vacancies 304 in the dielectric layer 206. The first conductive layer 312*a* formed between the first oxygen donor layer 210*a* and the dielectric layer 206 may grow thicker. At this stage, the oxygen concentration of the first oxygen donor layer 210*a* increases along the thickness direction from the first surface A1 proximal to the dielectric layer 206 to the second surface A2 proximal to the first electrode 204.

Referring to FIG. 4F, a fifth voltage is supplied across the first electrode 204 and the second electrode 208. A net positive charge may be collected on the first electrode 204 and a net negative charge may be collected on the second electrode 208. In some embodiments, a net positive charge may be collected on the first electrode 204, while the second electrode 208 is connected to electrical ground. In alternative embodiments, the first electrode 204 is connected to electrical ground, while a net negative charge may be collected on the second electrode 208. In some embodiments, more of the oxygen ions 306 in the second oxygen donor layer 210*b* may be dissociated. In some embodiments, the entire second oxygen donor layer 210*b* is transformed into the second conductive layer 312*b*. The oxygen ions 306 generated from the second oxygen donor layer 210*b* may fill more of the oxygen vacancies 304 in the dielectric layer 206. A thickness of the second conductive layer 312*b* at this stage may be less than or substantially equal to a thickness of the second oxygen donor layer 210*b* of FIG. 4A.

Referring to FIG. 4G, a sixth voltage is supplied across the first electrode 204 and the second electrode 208. A net negative charge may be collected on the first electrode 204 and a net positive charge may be collected on the second electrode 208. In some embodiments, a net positive charge may be collected on the second electrode 208, while the first electrode 204 is connected to electrical ground. In alternative embodiments, the second electrode 208 is connected to electrical ground, while a net negative charge may be collected on the first electrode 204. In some embodiments, more of the oxygen ions 306 in the first oxygen donor layer 210*a* may be dissociated. In some embodiments, the entire first oxygen donor layer 210*a* is transformed into the first conductive layer 312*a*. The oxygen ions 306 generated from the first oxygen donor layer 210*a* may fill more of the oxygen vacancies 304 in the dielectric layer 206. A thickness of the first conductive layer 312*a* at this stage may be less than or substantially equal to a thickness of the first oxygen donor layer 210*a* of FIG. 4A.

A state of the capacitor structure 300 may vary depending on different applications. In some embodiments, the capacitor structure 300 may remain in a state where the oxygen concentration of the second oxygen donor layer 210*b* increases along the thickness direction from the first surface B1 proximal to the dielectric layer 206 to the second surface B2 proximal to the second electrode 208, and the oxygen concentration of the first oxygen donor layer 210*a* increases along the thickness direction from the first surface A1 proximal to the dielectric layer 206 to the second surface A2 proximal to the first electrode 204. In alternative embodiments, the capacitor structure 300 may remain in a state where the entire first oxygen donor layer 210*a* is transformed into the first conductive layer 312*a* and the entire second oxygen donor layer 210*b* is transformed into the second conductive layer 312*b*. Alternatively, the capacitor structure 300 may remain in a state where the entire second oxygen donor layer 210*b* is transformed into the second conductive layer 312*b*, while the oxygen concentration of the first oxygen donor layer 210*a* increases along the thickness direction from the first surface A1 proximal to the dielectric layer 206 to the second surface A2 proximal to the first electrode 204.

The proposed structures provide advantages. During operation of the capacitor structure 300, oxygen vacancies are generated in the dielectric layer 206. A presence of the first and second oxygen donor layers 210*a* and 210*b* may provide oxygen to the oxygen vacancies 304 in the dielectric layer 206. Thus, a density of the oxygen vacancies in the dielectric layer 206 may be reduced. The presence of the first and second oxygen donor layers 210*a* and 210*b* may also respectively provide clear interfaces between the dielectric layer 206 and the first electrode 204, and between the dielectric layer 206 and the second electrode 208, which may reduce a leakage current and increase a durability of the capacitor structure 300. With the presence of the first and second oxygen donor layers 210*a* and 210*b*, the capacitor structure 300 may be operated for about $10^9$ cycles to about $10^{18}$ cycles.

Figure 5:
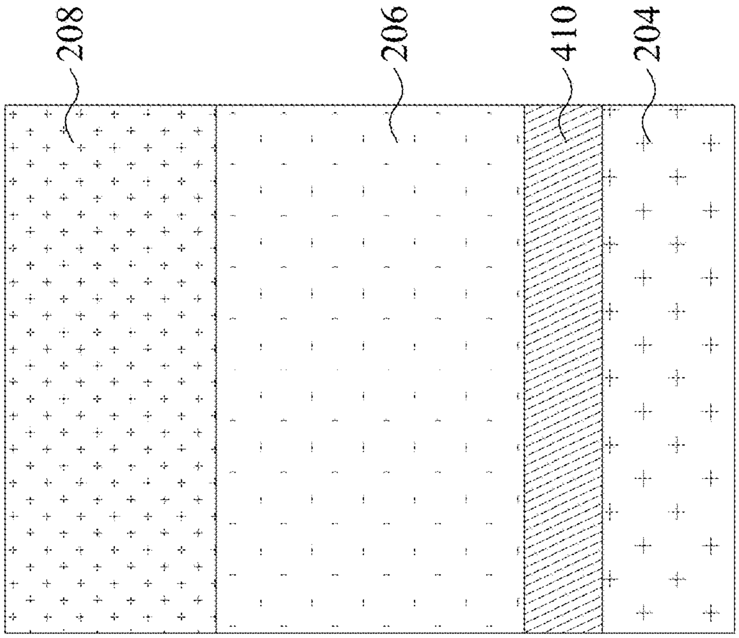
FIG. 5 is a schematic cross-sectional view of a capacitor structure according to aspects of one or more embodiments of the present disclosure.

FIG. 5 is a schematic cross-sectional view of a capacitor structure 400 according to aspects of one or more embodiments of the present disclosure. Referring to FIG. 5, the capacitor structure 400 may include only one oxygen donor layer 410 disposed between the dielectric layer 206 and the first electrode 204. The material and fabricating operation of the oxygen donor layer 410 can be similar to those of the oxygen donor layer 210.

Figure 6:
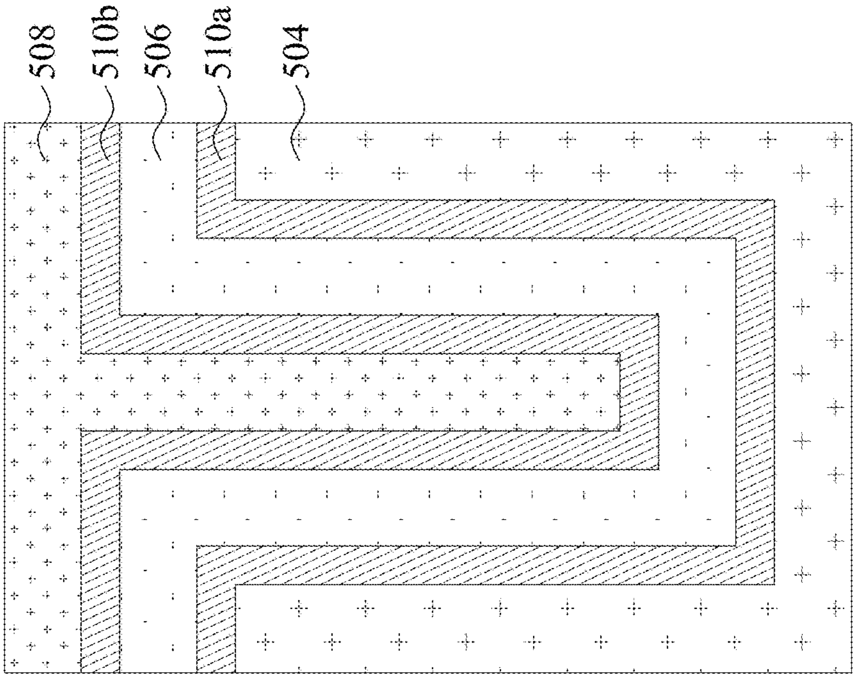
FIG. 6 is a schematic cross-sectional view of a capacitor structure according to aspects of one or more embodiments of the present disclosure.

FIG. 6 is a schematic cross-sectional view of a capacitor structure 500 according to aspects of one or more embodiments of the present disclosure. Referring to FIG. 6, the capacitor structure 500 may have a first electrode 504, a dielectric layer 506 and a second electrode 508. The dielectric layer 506 is interposed between the first electrode 504 and the second electrode 508. The capacitor structure 500 further includes a first oxygen donor layer 510*a* disposed between the first electrode 504 and the dielectric layer 506, and a second oxygen donor layer 510*b* disposed between the second electrode 508 and the dielectric layer 506. In some embodiments, the first electrode 504 may have a concave profile. In some embodiments, the dielectric layer 506 is substantially conformal with respect to a profile of the first electrode 504. The first oxygen donor layer 510*a* and the second oxygen donor layer 510*b* may be substantially conformal with respect to a profile of the first electrode 504. The material of the first electrode 504, the dielectric layer 506 and the second electrode 508 can be similar to those of the first electrode 204, the dielectric layer 206 and the second electrode 208, respectively. The material of the first oxygen donor layer 510*a* and the second oxygen donor layer 510*b* can be similar to those of the oxygen donor layer 210.

The capacitor structures provided by the present disclosure can be integrated within an interconnection structure of a semiconductor structure. In some embodiments, the capacitor structures can be integrated with a semiconductor substrate or a transistor structure.

Figure 7:
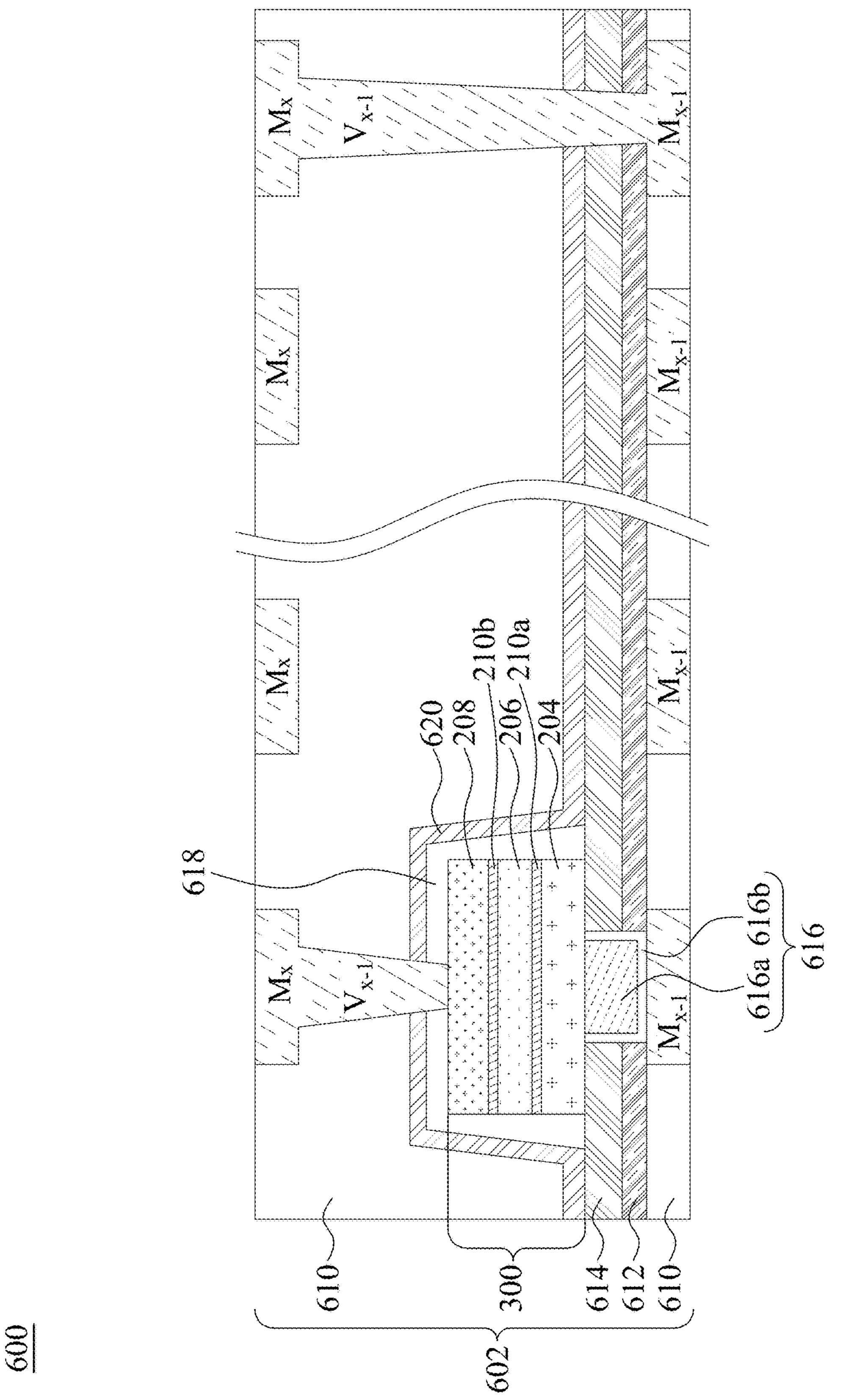
FIG. 7 shows a schematic cross-sectional view of a semiconductor structure according to aspects of one or more embodiments of the present disclosure.

FIG. 7 shows a schematic cross-sectional view of a semiconductor structure 600 having a capacitor structure 300 integrated within an interconnection structure 602 according to aspects of one or more embodiments of the present disclosure. The semiconductor structure 600 includes an interconnection structure 602. The interconnection structure 602 may include one or more inter-metal dielectric (IMD) layers 610 and one or more dielectric layers 612 and 614. The IMD layer 610 may surround metal lines $M_x$ and $M_{x-1}$ that include, for example, copper, tungsten, and/or aluminum. The IMD layer 610 may further surround metal vias $V_{x-1}$ that include, for example, copper, tungsten, and/or aluminum. The dielectric layers 612 and 614 may surround one or more contact vias 616 that are electrically connected to the capacitor structure 300. The contact via 616 may be a single-layered or multi-layered structure. In some embodiments, the contact via 616 may include a first conductive layer 616*a* and a second conductive layer 616*b*. The metal line $M_x$ is electrically connected to the second electrode 208 of capacitor structure 300 through the metal via $V_{x-1}$. The metal line $M_{x-1}$ is electrically connected to the first electrode 204 of capacitor structure 300 through the contact via 616. The interconnection structure 602 may further include an isolation layer 618 and a passivation layer 620 surrounding the capacitor structure 300.

Figure 8:
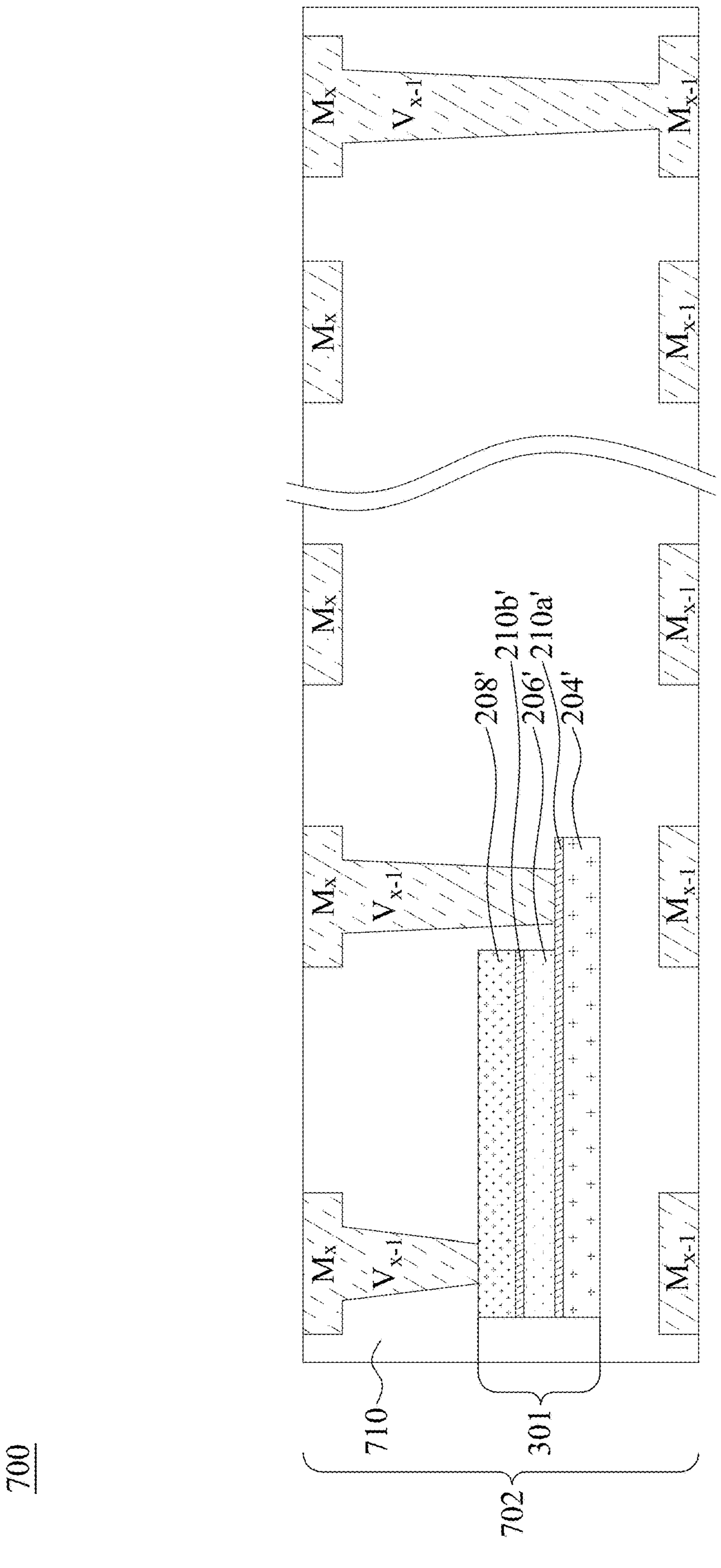
FIG. 8 shows a schematic cross-sectional view of a semiconductor structure according to aspects of one or more embodiments of the present disclosure.

FIG. 8 shows a schematic cross-sectional view of a semiconductor structure 700 having a capacitor structure 301 integrated within an interconnection structure 702 according to aspects of one or more embodiments of the present disclosure. The semiconductor structure 700 includes an interconnection structure 702. The interconnection structure 702 may include one or more inter-metal dielectric (IMD) layers 710. The IMD layer 710 may surround metal lines $M_x$ and $M_{x-1}$, and metal vias $V_{x-1}$. The first electrode 204' and the second electrode 208' of the capacitor structure 301 may have different lengths. For example, a length of the first electrode 204' is greater than a length of the second electrode 208'. The first oxygen donor layer 210*a'* and the second oxygen donor layer 210*b'* of the capacitor structure 301 may have different lengths. For example, a length of the first oxygen donor layer 210*a'* is greater than a length of the second oxygen donor layer 210*b'*. One of the metal lines $M_x$ is electrically connected to the second electrode 208' of capacitor structure 301 through the metal via $V_{x-1}$. Another metal line $M_x$ is electrically connected to the first electrode 204' of capacitor structure 301 through another metal via $V_{x-1}$.

Figure 9:
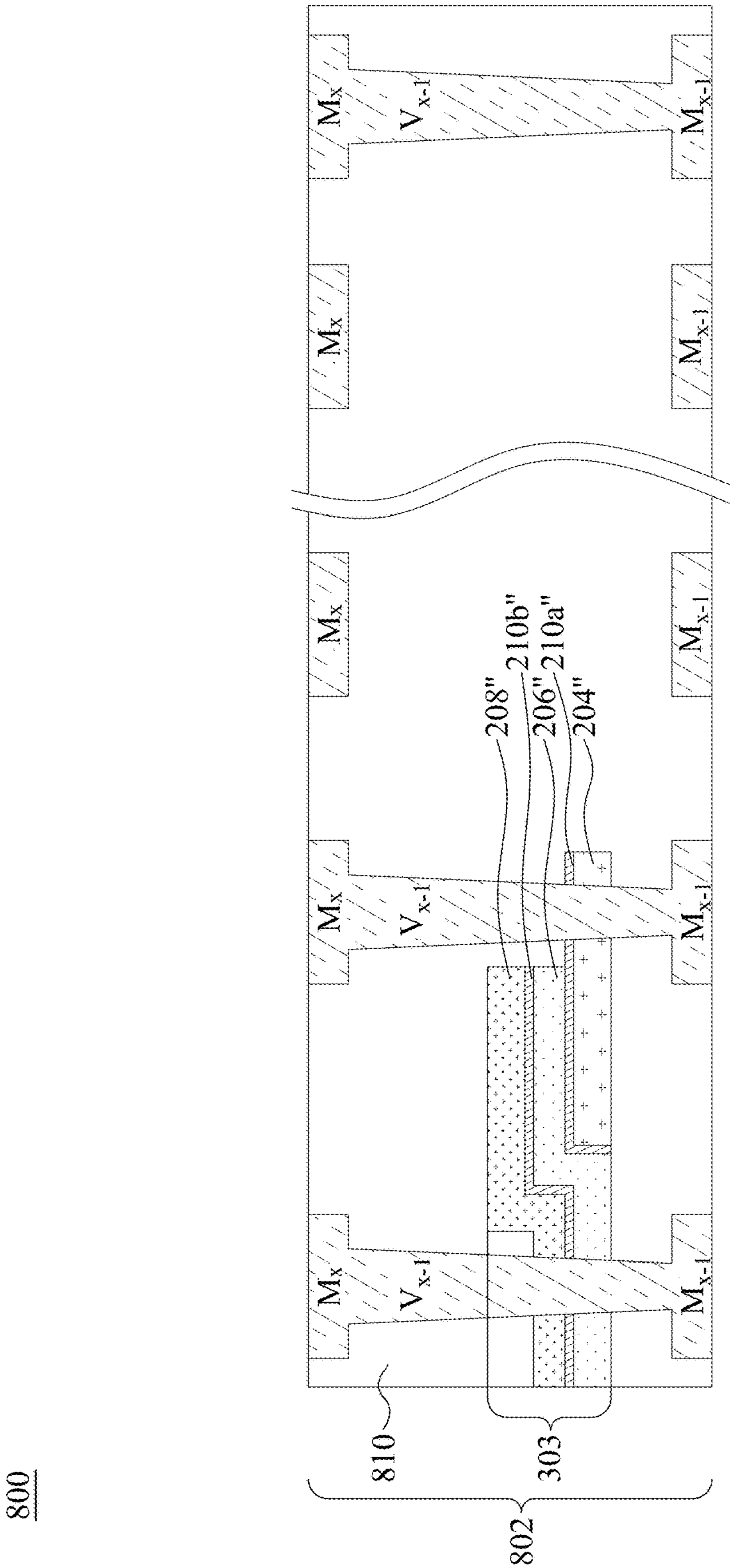
FIG. 9 shows a schematic cross-sectional view of a semiconductor structure according to aspects of one or more embodiments of the present disclosure.

FIG. 9 shows a schematic cross-sectional view of a semiconductor structure 800 having a capacitor structure 303 integrated within an interconnection structure 802 according to aspects of one or more embodiments of the present disclosure. The semiconductor structure 800 includes an interconnection structure 802. The interconnection structure 802 may include one or more inter-metal dielectric (IMD) layers 810. The IMD layer 810 may surround metal lines $M_x$ and $M_{x-1}$, and metal vias $V_{x-1}$. The first electrode 204" and the second electrode 208" of the capacitor structure 303 may have different lengths. Further, the first oxygen donor layer 210*a"* and the second oxygen donor layer 210*b"* of the capacitor structure 303 may have different lengths. One of the metal lines $M_x$ is electrically connected to the second electrode 208" of capacitor structure 303 through a sidewall of the metal via $V_{x-1}$. Another metal line $M_x$ is electrically connected to the first electrode 204" of capacitor structure 303 through a sidewall of another metal via $V_{x-1}$.

Figure 10:
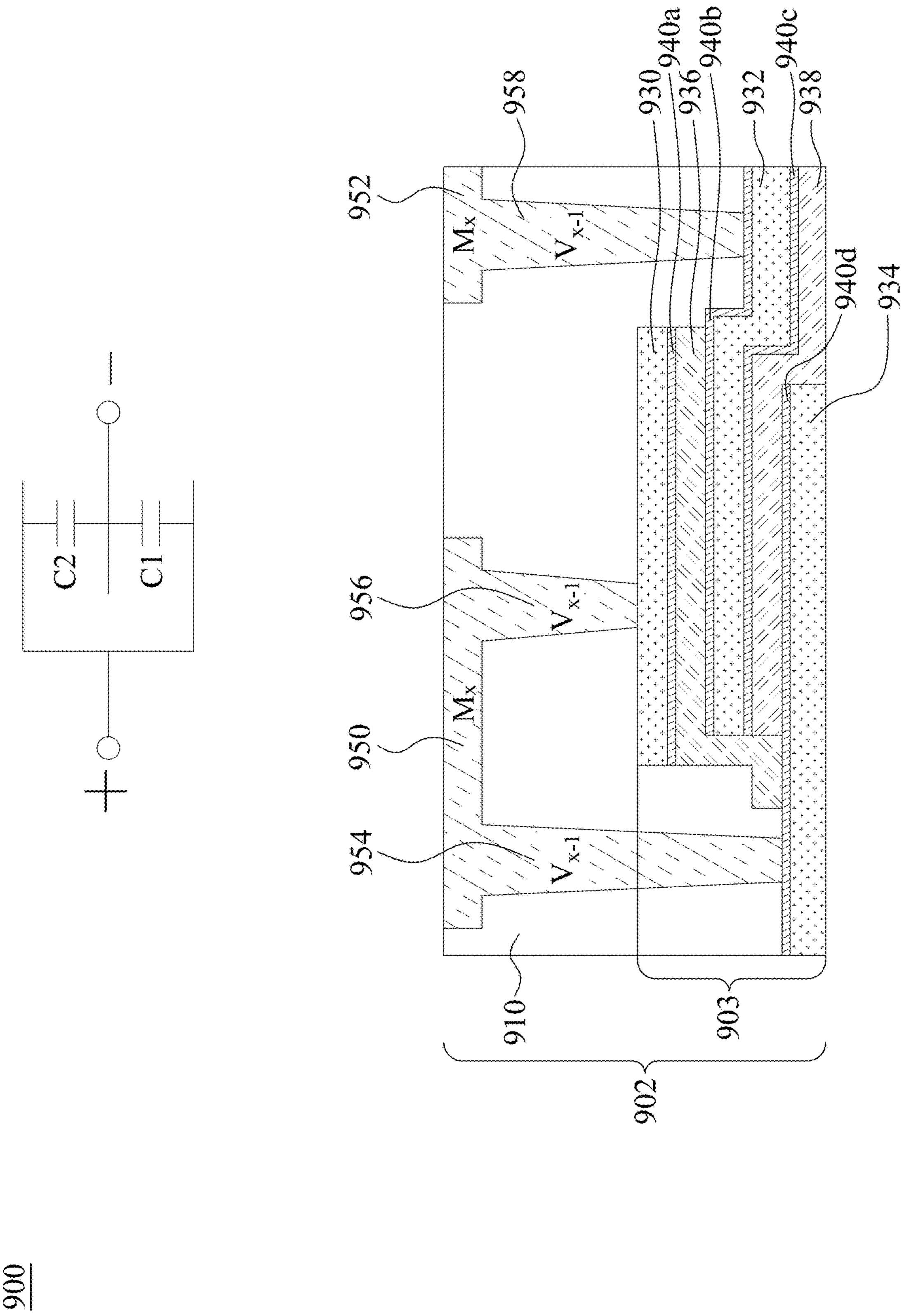
FIG. 10 shows a schematic cross-sectional view of a semiconductor structure according to aspects of one or more embodiments of the present disclosure.

FIG. 10 shows a schematic cross-sectional view of a semiconductor structure 900 having a capacitor structure 903 integrated within an interconnection structure 902 according to aspects of one or more embodiments of the present disclosure. The semiconductor structure 900 includes an interconnection structure 902. The interconnection structure 902 may include one or more inter-metal dielectric (IMD) layers 910. The IMD layer 910 may surround metal lines 950 and 952, and metal vias 954, 956 and 958.

The capacitor structure 903 may include three electrodes. For example, the capacitor structure 903 includes a top electrode 930, a middle electrode 932 and a bottom electrode 934. The capacitor structure 903 may further include a dielectric layer 936 interposed between the top electrode 930 and the middle electrode 932, and a dielectric layer 938 interposed between the middle electrode 932 and the bottom electrode 934. The capacitor structure 903 further includes an oxygen donor layer 940*a* between the top electrode 930 and the dielectric layer 936, an oxygen donor layer 940*b* between the dielectric layer 936 and the middle electrode 932, an oxygen donor layer 940*c* between the middle electrode 932 and the dielectric layer 938, and an oxygen donor layer 940*d* between the dielectric layer 938 and the bottom electrode 934.

The top electrode 930 is electrically connected to a metal line 950 through a metal via 956. The bottom electrode 934 is electrically connected to the metal line 950 through a metal via 954. The middle electrode 932 is electrically connected to another metal line 952 through a metal via 958. A total capacitance of the capacitor structure 903 equal to a sum of a capacitance C1 between the top electrode 930 and the middle electrode 932 and a capacitance C2 between the middle electrode 932 and the bottom electrode 934.

The embodiments of the present disclosure have some advantageous features. During operation of the capacitor structure, oxygen vacancies will be generated in the dielectric layer. The presence of the oxygen donor layer may provide oxygen to the oxygen vacancies in the dielectric layer. Thus, the density of the oxygen vacancies in the dielectric layer may be reduced. The presence of the oxygen donor layer may also provide clear interface between the dielectric layer and the electrode, which may reduce the leakage current and increase the endurance of the capacitor structure.

In accordance with some embodiments of the present disclosure, a capacitor structure includes a first electrode and a second electrode; a dielectric layer between the first electrode and the second electrode; and a first oxygen donor layer between the dielectric layer and the first electrode. In some embodiments, the first oxygen donor layer includes a first plurality of oxygen atoms, and a concentration of the first plurality of oxygen atoms in the first oxygen donor layer increases along a thickness direction from a first surface proximal to the dielectric layer to a second surface proximal to the first electrode.

In accordance with some embodiments of the present disclosure, a method for manufacturing a capacitor structure includes receiving a substrate; forming a first electrode, a dielectric layer and a second electrode over the substrate; and forming an oxygen donor layer between the dielectric layer and the second electrode, wherein the oxygen donor layer is configured to dissociate an oxygen to fill an oxygen vacancy in the dielectric layer.

In accordance with some embodiments of the present disclosure, a method for operating a capacitor structure includes receiving a capacitor structure having a first electrode and a second electrode, a dielectric layer between the first electrode and the second electrode, and an oxygen donor layer between the first electrode and the dielectric layer; supplying a first voltage across the first electrode and the second electrode, causing a net positive charge to collect on the first electrode and a net negative charge to collect on the second electrode, and forming a plurality of oxygen vacancies in the dielectric layer; dissociating at least one oxygen ion from the oxygen donor layer; and filling at least one of the plurality of oxygen vacancies in the dielectric layer with the at least one oxygen ion, wherein the oxygen donor layer has a reduced thickness after the dissociation of the at least one oxygen ion from the oxygen donor layer.

In accordance with some embodiments of the present disclosure, a capacitor structure is provided. The capacitor structure includes a first electrode, a second electrode, a dielectric layer between the first electrode and the second electrode, a first oxygen donor layer between the dielectric layer and the first electrode, a second oxygen donor layer between the dielectric layer and the second electrode, a first conductive layer between the first oxygen donor layer and the dielectric layer, and a second conductive layer between the second oxygen donor layer and the dielectric layer. An oxygen concentration of the first oxygen donor layer increases along a thickness direction from a first surface proximal to the dielectric layer to a second surface proximal to the first electrode. An oxygen concentration of the second oxygen donor layer increases along a thickness direction from a first surface proximal to the dielectric layer to a second surface proximal to the second electrode. A metal atom of the first electrode and a metal atom of the second electrode are different from a metal atom of the first oxygen donor layer and different from a metal atom of the second oxygen donor layer.

In accordance with some embodiments of the present disclosure, a capacitor structure is provided. The capacitor structure includes a first electrode, a second electrode, a dielectric layer between the first electrode and the second electrode, a first oxygen donor layer between the dielectric layer and the first electrode, and a second oxygen donor layer between the dielectric layer and the second electrode. An oxygen concentration of the first oxygen donor layer increases along a thickness direction from a first surface proximal to the dielectric layer to a second surface proximal to the first electrode. An oxygen concentration of the second oxygen donor layer increases along a thickness direction from a first surface proximal to the dielectric layer to a second surface proximal to the second electrode. The first electrode has a concave profile. The first oxygen donor layer, the dielectric layer, and the second oxygen donor layer are conformal with respect to the concave profile of the first electrode. A metal atom of the first electrode and a metal atom of the second electrode are different from a metal atom of the first oxygen donor layer and different from a metal atom of the second oxygen donor layer.

In accordance with some embodiments of the present disclosure, a semiconductor structure is provided. The semiconductor structure include a first metal line in a dielectric layer, a capacitor over the first metal line, a second metal line over the capacitor structure, a first metal via disposed between and coupled to the first metal line and the capacitor structure, and a second metal via disposed between and coupled to the second metal line and the capacitor structure. The capacitor structure includes a first electrode, a second electrode, a dielectric layer between the first electrode and the second electrode, a first oxygen donor layer between the dielectric layer and the first electrode, and a second oxygen donor layer between the dielectric layer and the second electrode.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A capacitor structure, comprising:

a first electrode and a second electrode;

a dielectric layer between the first electrode and the second electrode;

a first oxygen donor layer between the dielectric layer and the first electrode, wherein an oxygen concentration of the first oxygen donor layer increases along a thickness direction from a first surface proximal to the dielectric layer to a second surface proximal to the first electrode;

a second oxygen donor layer between the dielectric layer and the second electrode the oxygen donor layer, wherein an oxygen concentration of the second oxygen donor layer increases along a thickness direction from a first surface proximal to the dielectric layer to a second surface proximal to the second electrode;

a first conductive layer between the first oxygen donor layer and the dielectric layer; and a second conductive layer between the second oxygen donor layer and the dielectric layer, wherein a metal atom of the first electrode and a metal atom of the second electrode are different from a metal atom of the first oxygen donor layer and different from a metal atom of the second oxygen donor layer, wherein the second conductive layer has a first thickness when a first net positive charge is collected on the first electrode and a second thickness when a second net positive charge is collected on the first electrode, and the second thickness is greater than the first thickness.

2. The capacitor structure of claim 1, wherein the first conductive layer has a first thickness when a first net negative charge is collected on the first electrode and a second thickness when a second net negative charge is collected on the first electrode, and the second thickness is greater than the first thickness.

3. The capacitor structure of claim 1, wherein the first oxygen donor layer and the second oxygen donor layer respectively comprise a metal oxide.

4. The capacitor structure of claim 3, wherein the metal oxide includes noble metal oxide.

5. The capacitor structure of claim 1, wherein a Gibbs free energy (ΔG) of the first oxygen donor layer and a Gibbs free energy (ΔG) of the second oxygen donor layer are greater than a Gibbs free energy (ΔG) of the dielectric layer.

6. The capacitor structure of claim 1, wherein a resistivity of the first oxygen donor layer and a resistivity of the second oxygen donor layer are respectively less than 200 microohm centimeter (uohm-cm).

7. The capacitor structure of claim 1, wherein a thickness of the first oxygen donor layer is less than a thickness of the dielectric layer, and a thickness of the second oxygen donor layer is less than the thickness the dielectric layer.

8. The capacitor structure of claim 1, wherein a metal atom of the first conductive layer is same as the metal atom of the first oxygen donor layer.

9. The capacitor structure of claim 1, wherein a metal atom of the second conductive layer is same as the metal atom of the second oxygen donor layer.

10. A capacitor structure, comprising:

a first electrode and a second electrode;

a dielectric layer between the first electrode and the second electrode;

a first oxygen donor layer between the dielectric layer and the first electrode, wherein an oxygen concentration of the first oxygen donor layer increases along a thickness direction from a first surface proximal to the dielectric layer to a second surface proximal to the first electrode;

a first conductive layer between the first oxygen donor layer and the dielectric layer; and a second oxygen donor layer between the dielectric layer and the second electrode the oxygen donor layer, wherein an oxygen concentration of the second oxygen donor layer increases along a thickness direction from a first surface proximal to the dielectric layer to a second surface proximal to the second electrode, wherein the first electrode has a concave profile, the first oxygen donor layer, the dielectric layer, and the second oxygen donor layer are conformal with respect to the concave profile of the first electrode, wherein a metal atom of the first electrode and a metal atom of the second electrode are different from a metal atom of the first oxygen donor layer and different from a metal atom of the second oxygen donor layer, wherein the first conductive layer has a first thickness when a first net negative charge is collected on the first electrode and a second thickness when a second net negative charge is collected on the first electrode, and the second thickness is greater than the first thickness.

11. The capacitor structure of claim 10, further comprising a second conductive layer between the second donor layer and the dielectric layer.

12. The capacitor structure of claim 11, wherein the second conductive layer has a first thickness when a first net positive charge is collected on the first electrode and a second thickness when a second net positive charge is collected on the first electrode, and the second thickness is greater than the first thickness.

13. The capacitor structure of claim 10, wherein a thickness of the first oxygen donor layer is less than a thickness of the dielectric layer, and a thickness of the second oxygen donor layer is less than the thickness the dielectric layer.

14. A capacitor structure, comprising:

a first electrode and a second electrode;

a dielectric layer between the first electrode and the second electrode;

a first oxygen donor layer between the dielectric layer and the first electrode, wherein an oxygen concentration of the first oxygen donor layer increases along a thickness direction from a first surface proximal to the dielectric layer to a second surface proximal to the first electrode;

a second oxygen donor layer between the dielectric layer and the second electrode the oxygen donor layer, wherein an oxygen concentration of the second oxygen donor layer increases along a thickness direction from a first surface proximal to the dielectric layer to a second surface proximal to the second electrode;

a first conductive layer between the first oxygen donor layer and the dielectric layer; and a second conductive layer between the second oxygen donor layer and the dielectric layer, wherein a metal atom of the first electrode and a metal atom of the second electrode are different from a metal atom of the first oxygen donor layer and different from a metal atom of the second oxygen donor layer, wherein the first conductive layer has a first thickness when a first net negative charge is collected on the first electrode and a second thickness when a second net negative charge is collected on the first electrode, and the second thickness is greater than the first thickness.

15. The capacitor structure of claim 14, wherein the first oxygen donor layer and the second oxygen donor layer respectively comprise a metal oxide.

16. The capacitor structure of claim 15, wherein the metal oxide includes noble metal oxide.

17. The capacitor structure of claim 14, wherein a Gibbs free energy (ΔG) of the first oxygen donor layer and a Gibbs free energy (ΔG) of the second oxygen donor layer are greater than a Gibbs free energy (ΔG) of the dielectric layer.

18. The capacitor structure of claim 14, wherein a resistivity of the first oxygen donor layer and a resistivity of the second oxygen donor layer are respectively less than 200 microohm centimeter (uohm-cm).

19. The capacitor structure of claim 14, wherein a thickness of the first oxygen donor layer is less than a thickness of the dielectric layer, and a thickness of the second oxygen donor layer is less than the thickness the dielectric layer.

20. The capacitor structure of claim 14, wherein a metal atom of the first conductive layer is same as the metal atom of the first oxygen donor layer, and a metal atom of the second conductive layer is same as the metal atom of the second oxygen donor layer.

* * * * *